(12) United States Patent
Matsuda

(10) Patent No.: US 6,230,108 B1
(45) Date of Patent: May 8, 2001

(54) REALTIME SENSITIVITY CORRECTION METHOD AND INFRARED IMAGING SYSTEM

(75) Inventor: Yuuichi Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/176,824

(22) Filed: Oct. 22, 1998

(30) Foreign Application Priority Data

Oct. 23, 1997 (JP) .................................... 9-290730
Jun. 11, 1998 (JP) ................................. 10-163078

(51) Int. Cl.[7] ............................ G01K 11/30; H01L 27/00
(52) U.S. Cl. ......................... 702/99; 702/130; 702/134; 702/135; 250/208.1; 358/463
(58) Field of Search .............................. 702/99, 130, 134, 702/135, 136; 250/208.1, 238, 338.1, 339.3, 339.4, 559.1; 358/462, 463; 378/37, 62, 63

(56) References Cited

U.S. PATENT DOCUMENTS

| | | | |
|---|---|---|---|
| 4,419,692 | * 12/1983 | Modisette et al. | 348/167 |
| 5,144,149 | * 9/1992 | Frosch | 250/493.1 |
| 5,994,699 | * 11/1999 | Akagawa | 250/332 |

FOREIGN PATENT DOCUMENTS 58-151181   9/1983  (JP) .
9-163228    6/1997  (JP) .
9-307815    11/1997 (JP) .

* cited by examiner

Primary Examiner—Marc S. Hoff
Assistant Examiner—Hien Vo
(74) Attorney, Agent, or Firm—Helfgott & Karas, P.C.

(57) ABSTRACT

A realtime sensitivity correction method for use in an infrared imaging system, which compensates for possible sensitivity variations among a plurality of sensor elements constituting a infrared sensor device. The infrared imaging system comprises: an infrared sensor which accepts infrared rays emanating from a target object through an appropriate optical system, two reference heat sources, a sensitivity correction circuit composed of digital signal processors, RAM, and other components, a sensitivity correction sequence controller, and a video monitor. The system's scanning cycle consists of an effective scanning period and a non-effective scanning period. During a non-effective scanning period, the infrared sensor scans the high-temperature and normal-temperature reference heat sources. By averaging the detected values, high-temperature reference data and normal-temperature reference data are obtained. Sensitivity correction coefficients are then calculated from the high-temperature and normal-temperature reference data. In the subsequent effective scanning period, the infrared sensor scans the target object, and the resultant image data is corrected according to the sensitivity correction coefficients.

17 Claims, 29 Drawing Sheets

FIG. 2(A)

| LINE → | 1 | 2 | 3 | 4 | ----- 297 | 298 | 299 | 300 |
|---|---|---|---|---|---|---|---|---|
| SENSOR ELEMENT ↓ | 1 | 1 | 1 | 1 | 1 | 1 | 1 | 1 |
| | 2 | 2 | 2 | 2 | 2 | 2 | 2 | 2 |
| | 3 | 3 | 3 | 3 | 3 | 3 | 3 | 3 |
| | 4 | 4 | 4 | 4 | 4 | 4 | 4 | 4 |
| | 5 | 5 | 5 | 5 | 5 | 5 | 5 | 5 |
| | 6 | 6 | 6 | 6 | 6 | 6 | 6 | 6 |
| | 7 | 7 | 7 | 7 | 7 | 7 | 7 | 7 |
| | 8 | 8 | 8 | 8 | 8 | 8 | 8 | 8 |
| | 9 | 9 | 9 | 9 | 9 | 9 | 9 | 9 |
| | 10 | 10 | 10 | 10 | 10 | 10 | 10 | 10 |
| | ⋮ | ⋮ | ⋮ | ⋮ | ⋮ | ⋮ | ⋮ | ⋮ |
| | 195 | 195 | 195 | 195 | 195 | 195 | 195 | 195 |
| | 196 | 196 | 196 | 196 | 196 | 196 | 196 | 196 |
| | 197 | 197 | 197 | 197 | 197 | 197 | 197 | 197 |
| | 198 | 198 | 198 | 198 | 198 | 198 | 198 | 198 |
| | 199 | 199 | 199 | 199 | 199 | 199 | 199 | 199 |
| | 200 | 200 | 200 | 200 | 200 | 200 | 200 | 200 |

FIG. 2(B)

IMAGE DATA

| FIRST LINE | SECOND LINE | THIRD LINE | |
|---|---|---|---|
| 1, 2, 3, 4, ···199, 200 | 1, 2, 3, 4, ···199, 200 | 1, 2, 3, 4, ···199, 200 | ··· |

| 298TH LINE | 299TH LINE | 300TH LINE |
|---|---|---|
| 1, 2, 3, 4, ···199, 200 | 1, 2, 3, 4, ···199, 200 | 1, 2, 3, 4, ···199, 200 |

REALTIME SENSITIVITY CORRECTION METHOD AND INFRARED IMAGING SYSTEM

BACKGROUND OF THE INVENTION

1. Field of the Invention

The present invention relates to a realtime sensitivity correction method for infrared sensors and an infrared imaging system employing a realtime sensitivity correction mechanism. More particularly, the present invention relates to a sensitivity correction method which compensates for the variations in sensitivity levels among a plurality of elements that constitute an infrared sensor device, and to an infrared imaging system having a function to correct the sensitivity variations among the infrared sensor elements.

2. Description of the Related Art

Infrared imaging systems are instruments that capture infrared images, or thermographs, of a target object by sensing infrared rays radiated from its surfaces. They are utilized in various industrial fields, for example, to observe temperature distribution on target surfaces or to detect the shape of an object. Infrared imaging systems fall roughly into two categories according to the wavelengths of infrared rays that they sense; one is for 3–5 $\mu$m band, and the other is for 8–10 $\mu$m band. The 8–10 $\mu$m band systems mainly use HgCdTe sensors, while the 3–5 $\mu$m band systems use infrared sensors made of PtSi, InSn, HgCdTe, or the like. With their material composition varied, HgCdTe sensors can be applied to relatively wide wavelength ranges.

Regarding the structure of sensor devices, one-dimensional (or linear) arrays are typically used for the above purposes, while there are other types of infrared sensors, such as ones composed of discrete elements or two-dimensional arrays. One-dimensional and two-dimensional arrays contain a plurality of sensor elements, and ideally, it is desirable that all elements provide uniform responses. In reality, however, some variations in sensitivity levels inevitably exist among the elements constituting an infrared sensor. This sensitivity variation will result in non-uniform sensor outputs for a target surface having a flat temperature distribution, thus giving inaccurate target images. To improve this situation, conventional infrared imaging systems employ a sensitivity correction mechanism that compensates for the unevenness of individual sensor elements by applying appropriate data processing to the detected signals.

This kind of sensitivity correction mechanisms would properly work as long as the sensor elements keep their initial characteristics. However, since the individual elements actually vary with time, it is hard for the above correction mechanisms to maintain their long-term accuracy of sensitivity compensation.

To solve this problem, another sensitivity correction method is proposed. This method uses reference heat sources being controlled at constant temperatures. Scanning the reference heat sources, the infrared sensor outputs reference temperature detection data. This data is used to quantify the sensitivity variations among a plurality of sensor elements, allowing compensation for them to be conducted in a later stage.

FIG. 28 shows a typical conventional infrared imaging system. Infrared rays emanating from object surfaces first enter an optical system 301, then pass through another optical system 302 having a scanning capability, and finally reach a linear infrared sensor 303. The analog detection signal produced by the infrared sensor 303 is amplified by an amplifier 304 and fed to an analog-to-digital (A/D) converter 305. The resultant digital detection signal is then subjected to a signal processing circuit 306 for sensitivity correction and other necessary processes. After that, a digital-to-analog (D/A) converter 307 converts the corrected signal back to an analog signal, thus allowing the captured and corrected infrared image to be displayed on a video monitor 308.

This infrared imaging system employs two reference heat sources 310 and 311 to compensate for the sensitivity differences among sensor elements as described earlier. The reference heat sources 310 and 311 are regulated to keep their respective temperatures. Their infrared outputs are given to the infrared sensor 303 by an optical system 302 during a part of the system's scanning cycle. More specifically, the system scans the target object at regular intervals. Each scanning cycle consists of an "effective scanning period" and a "non-effective scanning period." During the effective scanning period, the optical system 302 actually scans the target surfaces. Using the remaining time, or the non-effective scanning period, it scans the reference heat sources 310 and 311, thus enabling the infrared sensor 303 to output detection signals for the two different reference temperatures. The signal processing circuit 306 then processes these detection signals to calculate parameters to compensate for the sensitivity variations among the sensor elements.

FIG. 29 is a diagram which shows the structure of the optical systems of FIG. 28. To form an image of the target, the first optical system 301 comprises lenses 312 and 313, and the second optical system 302 comprises lenses 314 and 315. The second optical system further comprises two more lenses 316 and 316 to collect infrared rays emanating from the reference heat sources 310 and 311, together with two reflectors 317 and 319 to direct the rays to the infrared sensor 303. The linear infrared sensor 303 is disposed at the back of this optical system 302 in such a way that the array will be orthogonal to the direction of optical scanning. That is, the infrared imaging system scans the target both electronically (by the linear infrared sensor 303 itself) and optically (by the optical system 302), thus achieving a two-dimensional scanning operation.

Typically, the above-described scanning operation of the optical system 302 is conducted in concert with the raster scanning operation of the video monitor 308. In the case of interlaced video, for example, one complete picture, or frame, is obtained as a combination of two separate field scans. Here, the term "field" refers to a set of alternating lines in an interlaced video frame. In synchronization with the video monitor 308, the optical system 302 scans odd-numbered lines in one field and then even-numbered lines in the next field. The signal processing circuit 306 joins the infrared detection signals obtained in those two scans, thereby constructing a complete infrared image of the target.

During the non-effective scanning period, the optical system 302 scans the reference heat sources 310 and 311 being regulated at constant temperatures, thus directing their infrared rays to the infrared sensor 303. The unevenness in the infrared sensor outputs is measured in one non-effective scanning period, and this measurement result is used in the next or later effective scanning period(s) to correct the sensitivity of each individual sensor element.

The reference heat sources 310 and 311 can be implemented with Peltier effect devices, for example, with supply currents being controlled so that they will keep their respective set temperatures. While FIG. 29 illustrates a specific arrangement where the two reference heat sources 310 and 311 are placed separately across the center line, it is also possible to place both on one side. These two reference heat sources 310 and 311 provide a high and low temperatures determined according to the range of target temperatures that the infrared sensor 303 can detect. They are controlled so that they keep a predetermined temperature difference. This means that the system can make a sensitivity correction at least at two points within the detection temperature range of sensor elements.

The video monitor 308 typically uses a cathode ray tube (CRT) to display the captured infrared images. Video signals entered to the video monitor 308 conform to the National Television System Committee (NTSC) standard, which defines an interlaced video format where each frame is composed of two fields. In the NTSC format, one frame scanning cycle is 1/30 of a second, while one field scanning cycle is 1/60 of a second.

As mentioned earlier, the sensitivity variations among infrared sensor elements will degrade the accuracy of infrared images appearing on the video monitor 308. In other words, the target temperature distribution displayed on the video monitor 308 can be distorted because of the unevenness of the sensor's sensitivity levels. Particularly when the target temperature distribution dynamically changes with time at a relatively high rate, the above inaccuracies of displayed infrared images would make it difficult for the user to view the temperature changes.

As long as the target is stationary and its surface temperature distribution is time-invariant, conventional infrared imaging systems will provide near satisfactory results in terms of the accuracy of displayed infrared images, although they perform sensitivity correction only in an intermittent manner. However, when the target temperature distribution changes with time at a relatively high rate, the conventional correction mechanisms cannot catch up with the changes, thus causing inaccurate images to be displayed.

In addition to the sensitivity variations discussed above, there is another issue that should be considered when using one-dimensional or two-dimensional infrared sensors. These sensors contain a plurality of sensor elements, but some of them may exhibit abnormal response, such as too low output levels or too much noises, which are regarded as partial defects. The problem is that such faulty elements cannot be corrected by the aforementioned sensitivity correction mechanism, and infrared images of an object with a uniform temperature distribution would exhibit some visible errors. To address this problem, a pixel interpolation technique is implemented in conventional infrared imaging systems employ, as part of their image data processing capabilities. That is, the pixel data for a faulty sensor element is imitated by interpolating the outputs of neighboring normal elements.

In conventional infrared imaging systems, however, the presence of faulty sensor elements can be detected at their power-up time or in response to an operator's instruction. While defects can happen at any time during the operation, the conventional systems are unable to immediately find such a defect of a sensor element and to cope with the defect in a prompt manner. Since no compensation is effected, infrared images displayed on a monitor screen in this situation could not be satisfactory ones.

SUMMARY OF THE INVENTION

Taking the above into consideration, a first object of the present invention is to provide a realtime sensitivity correction method which compensates for the variations in sensitivity levels among a plurality of infrared sensor elements.

Moreover, a second object of the present invention is to provide an infrared imaging system which compensates for the variations in sensitivity levels among a plurality of infrared sensor elements in a realtime fashion.

Furthermore, a third object of the present invention is to provide an infrared imaging system which is capable of producing good infrared images even when it encounters failures of infrared sensor elements during operation.

To accomplish the first object of the present invention, there is provided a realtime sensitivity correction method which compensates for sensitivity variations among a plurality of sensor elements constituting an infrared sensor. This method comprises the following steps:

(a) controlling a high-temperature and normal-temperature reference heat sources so that individual temperatures thereof and a predetermined temperature difference therebetween will be maintained;

(b) obtaining reference temperature detection data by scanning the high-temperature and normal-temperature reference heat sources during a non-effective scanning period in which infrared rays emanating from a target object is not entered to the infrared sensor;

(c) obtaining high-temperature reference data and normal-temperature reference data by calculating average values of the reference temperature detection data;

(d) calculating sensitivity correction coefficients from the high-temperature reference data and the normal-temperature reference data;

(e) obtaining infrared image data by scanning the target object during an effective scanning period; and (f) by using the sensitivity correction coefficients, correcting the infrared image data during the effective scanning period.

To accomplish the second object, there is provided an infrared imaging system comprising the following elements:

(a) an infrared sensor having a plurality of sensor elements;

(b) a high-temperature and normal-temperature reference heat sources having a predetermined temperature offset, which are each controlled to maintain different temperatures;

(c) an optical system which scans a target object during an effective scanning period and scans said high-temperature and normal-temperature reference heat sources during a non-effective scanning period; and (d) a sensitivity correction circuit which compensates for sensitivity variations among the plurality of sensor elements constituting said infrared sensor, comprising a memory which stores high-temperature reference data and normal-temperature reference data obtained by scanning said high-temperature and normal-temperature reference heat sources during the non-effective scanning period, and a processing unit which calculates sensitivity correction coefficients from the high-temperature reference data and the normal-temperature reference data, and by using the calculated sensitivity correction coefficients, corrects infrared image data obtained by scanning the target object during the effective scanning period.

Further, to accomplish the third object of the present invention, there is provided an infrared imaging system having the following configuration. The system has a processing cycle time consisting of an effective scanning period and a non-effective scanning period. An infrared sensor acquires reference temperature detection data during the non-effective scanning period and captures an infrared image by scanning a target object during the effective scanning period. The system comprises the following elements:

(a) a reference temperature detection data storage unit for storing the reference temperature detection data during the non-effective scanning period, for each sensor element contained in the infrared sensor;

(b) a noise level calculation unit for calculating a noise level of each sensor element during the effective scanning period, referring to the reference temperature detection data stored in the reference temperature detection data storage unit;

(c) a faulty element identifier, being activated during the effective scanning period, for identifying a faulty sensor element exhibiting an abnormal noise level exceeding a predetermined threshold, by examining the noise levels calculated by the noise level calculation unit; and (d) a pixel substitution unit, activated during the effective scanning period, for replacing pixel data of the faulty sensor element with alternative pixel data produced by another sensor element that is located in the vicinity of the faulty sensor element being identified.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 2(A) and 2(B) are diagrams which show a typical image data format;

DESCRIPTION OF THE PREFERRED EMBODIMENTS

Five embodiments of the present invention will be described below with reference to the accompanying drawings.

Figure 1:
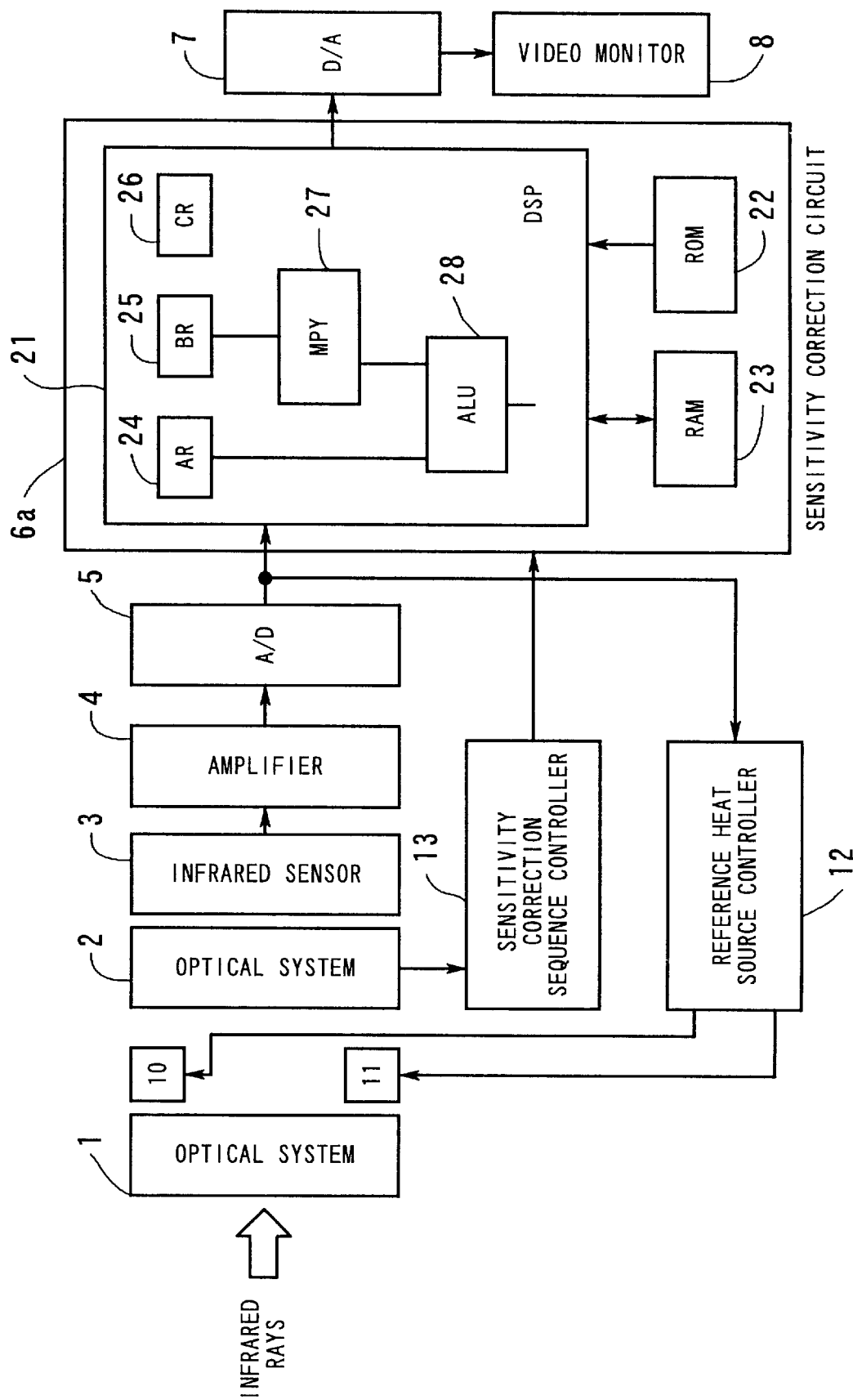
FIG. 1 is a block diagram which shows a first embodiment of the present invention.
Figure 28:
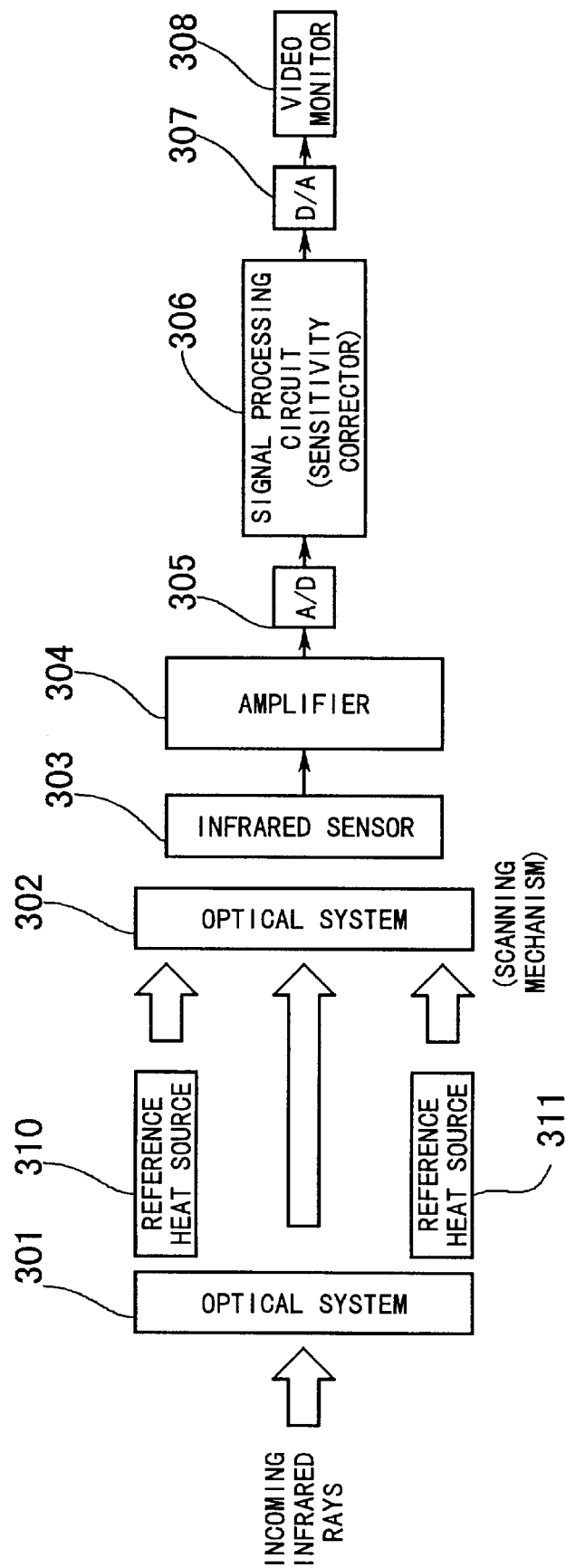
FIG. 28 is a diagram which shows a conventional infrared imaging system.
Figure 29:
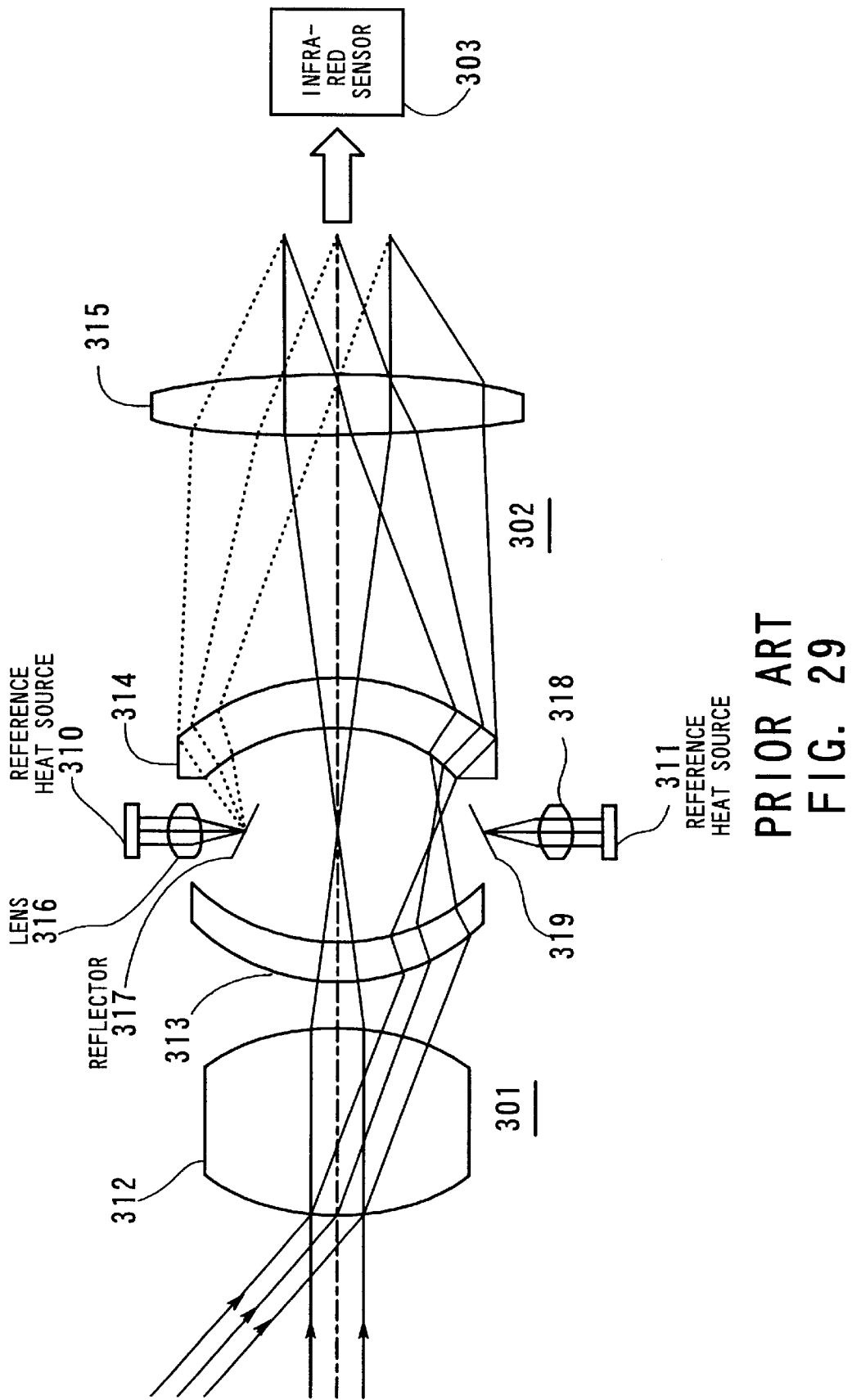
FIG. 29 is a diagram which shows the structure of an optical system.

FIG. 1 is a block diagram of an infrared imaging system according to a first embodiment of the present invention. This system comprises the following components: a first optical system 1, a second optical system 2, an infrared sensor 3, an amplifier 4, an A/D converter 5, a D/A converter 7, a video monitor 8, and reference heat sources 10 and 11. These components correspond to the first optical system 301, second optical system 302, infrared sensor 303, A/D converter 305, amplifier 304, D/A converter 307, video monitor 308, and reference heat sources 310 and 311, which constitute the conventional system explained earlier in FIGS. 28 and 29. The infrared imaging system of the present invention further comprises a sensitivity correction circuit 6a, a reference heat source controller 12, and a sensitivity correction sequence controller 13.

Infrared rays radiated from target object surfaces are entered into the infrared sensor 3 through the two optical systems 1 and 2. The system runs in synchronization with a timebase which determines the cycle of target object scanning and other related operations. This cycle consists of an effective scanning period and a non-effective scanning period. The system actually scans the target object during each effective scanning period. The non-effective scanning period is defined as the remaining period within a cycle. Using this non-effective scanning period, infrared rays generated by the reference heat sources 10 and 11 are given to the infrared sensor 3 through the second optical system 2. The analog detection signal of the infrared sensor 3 is fed to the analog-to-digital (A/D) converter 5 after being amplified by the amplifier 4. The resulting digital data is then supplied to the sensitivity correction circuit 6a. This sensitivity correction circuit 6a calculates sensitivity correction coefficients by examining the digital detection data which indicates the high and normal temperatures of the reference heat sources 10 and 11. With the sensitivity correction coefficients calculated, the sensitivity correction circuit 6a compensates for the sensitivity variations among the individual elements of the infrared sensor 3, thereby obtaining a correct infrared image of the target object. The D/A converter 7 converts the corrected image signal back to an analog signal, allowing the complete infrared image to be displayed on the video monitor 8.

The sensitivity correction circuit 6a comprises a digital signal processor (DSP) 21 which provides various signal processing functions, a read-only memory (ROM) 22 for firmware storage, and a random-access memory (RAM) 23 for temperature correction data storage. The DSP 21 comprises the following components: three registers named "A-Register" (AR) 24, "B-Register" (BR) 25, and "C-Register" (CR) 26; a multiplier (MPY) 27; and an arithmetic logic unit (ALU) 28.

Typically, Peltier effect devices are used as the reference heat sources 10 and 11. The reference heat source controller 12 controls them so that one will provide a high reference temperature and the other a normal reference temperature, keeping a predetermined temperature difference. Optionally, it is possible to configure the reference heat source controller 12 to vary the reference temperatures according to the target object's average temperature. This floating reference temperature scheme is accomplished by supplying the reference heat source controller 12 with the output signal of the A/D converter 5 as indicated by an arrow in FIG. 1, allowing it to calculate an average value of the target surface temperatures. The reference heat source controller 12 then controls the reference heat sources 10 and 11 so that their temperatures will follow the target's average temperature while maintaining a predetermined temperature difference.

The sensitivity correction sequence controller 13 produces some trigger signals from scan timing signals used in the second optical system 2, and gives them to the sensitivity correction circuit 6a. Being stimulated by these trigger signals, the sensitivity correction circuit 6a captures infrared detection signals for the reference heat sources 10 and 11 during a non-effective scanning period. The sensitivity correction circuit 6a then calculates sensitivity correction coefficients and applies them to the infrared detection signals that are obtained by scanning the target object surfaces during an effective scanning period.

Suppose here that the infrared sensor 3 is a linear array of 200 infrared sensor elements, and the optical system 2 is designed to scan 300 lines to obtain a single-field infrared image. FIG. 2(A) depicts the resulting image data. Here, raster image data for 300 scan lines are arranged in the horizontal direction, each line consisting of 200-pixel sensor outputs aligned in the vertical direction. This image data is serially entered to the sensitivity correction circuit 6a as shown in FIG. 2(B).

Figure 3:
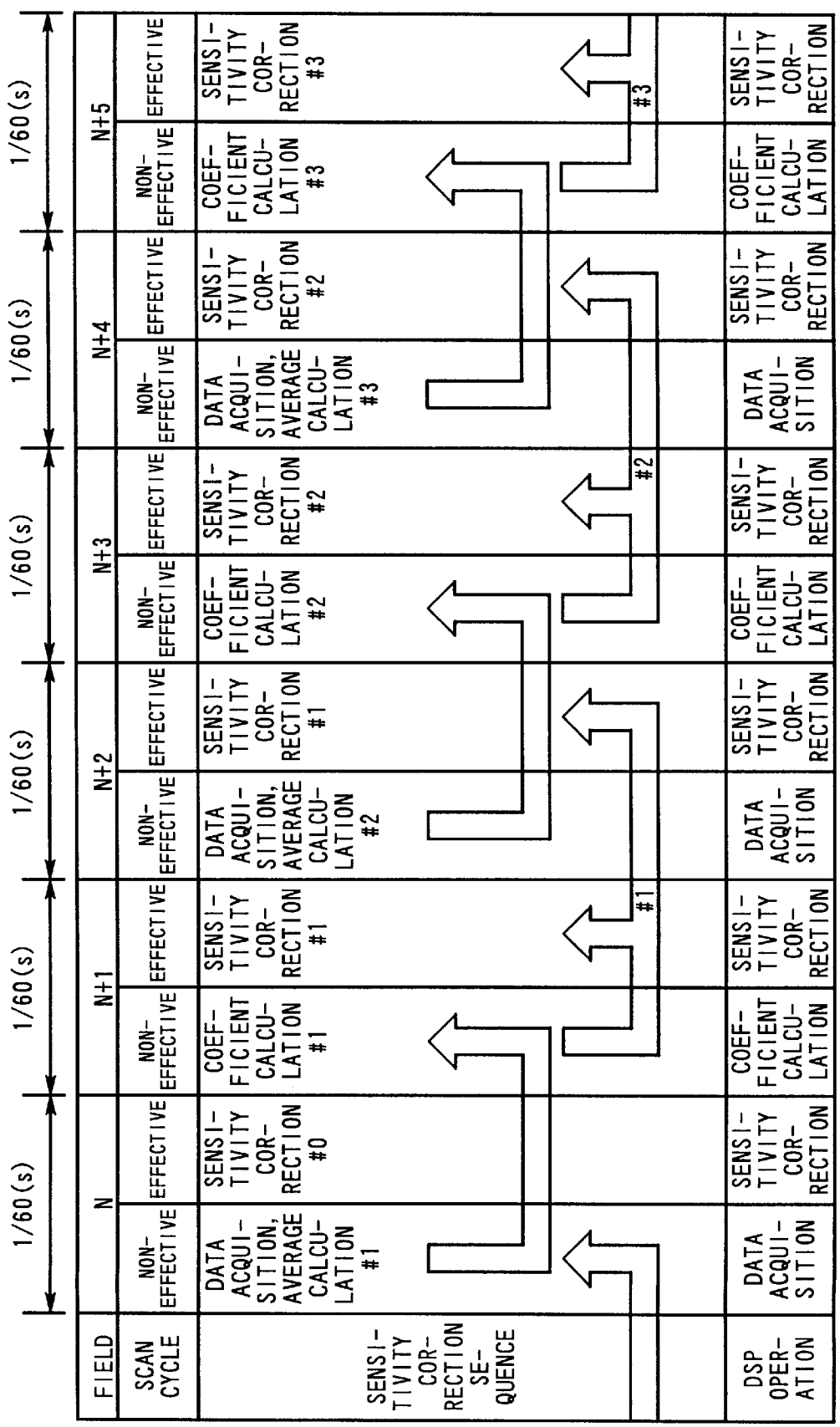
FIG. 3 is a diagram which shows an operation sequence of the first embodiment.

FIG. 3 is a sequence diagram which shows how the system will operate in the first embodiment. It is assumed here that the scanning cycle time of the optical system 2 is 1/60 of a second for one field, which is one half of an interlaced frame. FIG. 3 shows how the sensitivity correction sequence proceeds in conjunction with the operation of the DSP 21, during a series of fields N, N+1, N+2, and so on.

As mentioned earlier, the scanning cycle of each field consists of an effective scanning period and a non-effective scanning period. In the non-effective scanning period of field (N), analog detection signals are obtained by scanning the reference heat sources 10 and 11. The A/D converter 5 then converts them into digital data. The sensitivity correction circuit 6a acquires this data and calculates average values #1 of multiple samples of the high and normal reference temperatures. With these average values #1, it calculates sensitivity correction coefficients #1 during the non-effective scanning period of the next field (N+1). The calculated sensitivity correction coefficients #1 are used in two consecutive fields (N+1) and (N+2) to compensate for the sensitivity variations during their effective scanning period.

In the non-effective scanning period of field (N+2), the next detection data is obtained by scanning the reference heat sources 10 and 11. The sensitivity correction circuit 6a acquires this data and calculates average values #2, and with these average values #2, it calculates sensitivity correction coefficients #2 during the non-effective scanning period of the next field (N+3). The calculated sensitivity correction coefficients #2 are then used in the present and next fields, (N+3) and (N+4), to compensate for the sensitivity variations during the effective scanning period of those fields.

Figure 4:
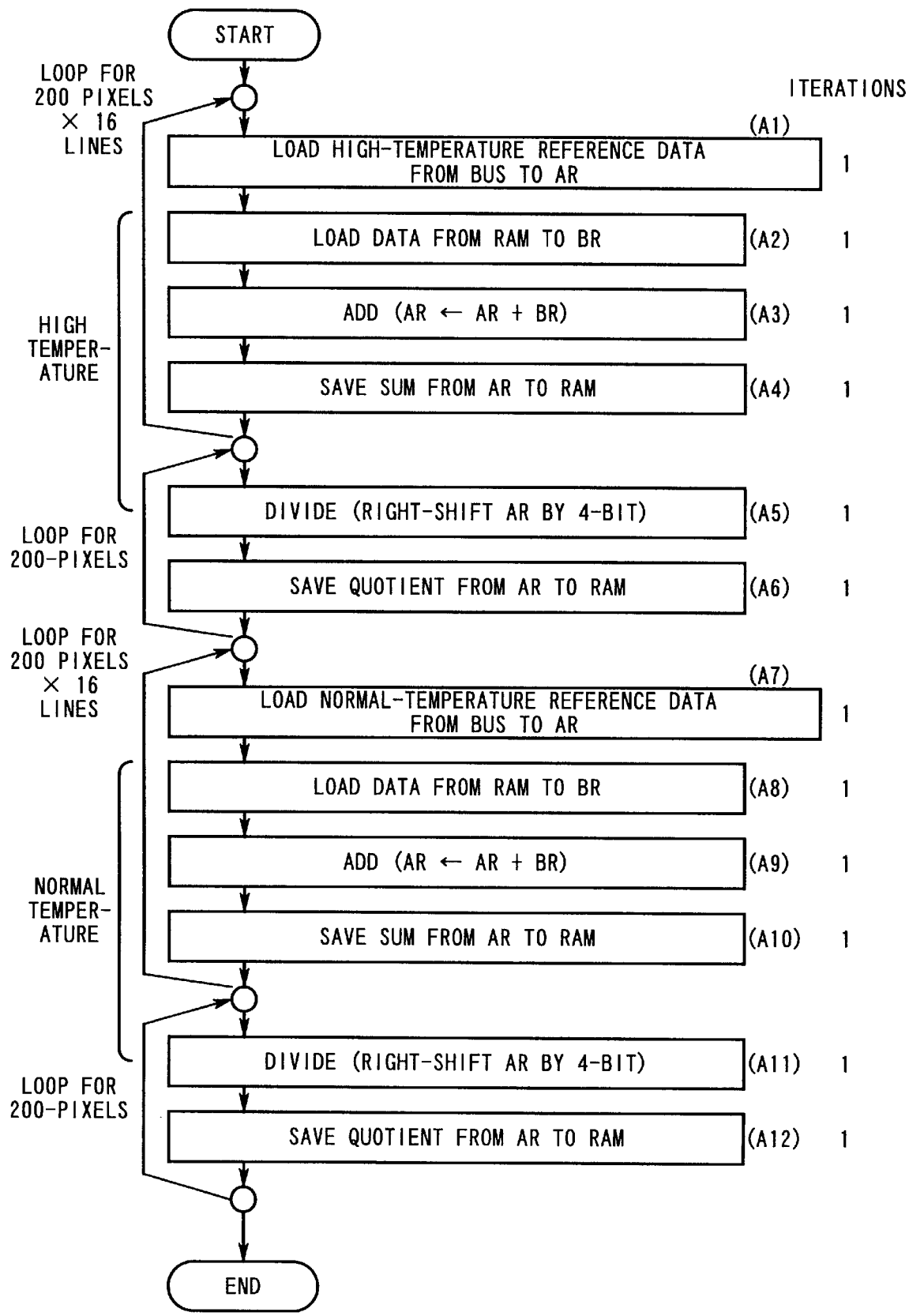
FIG. 4 is a flowchart which shows a process of reference data acquisition and average calculation.

FIG. 4 is a flowchart showing a typical process of reference data acquisition and average calculation, which is executed in the non-effective scanning periods as illustrated in FIG. 3. This process flowchart assumes the following configuration. First, the reference heat source 10 is maintained at a high temperature, while the reference heat source 11 at a normal temperature. Second, the two reference heat sources 10 and 11 are each scanned 16 times (i.e., 16 scan lines) in one non-effective scanning period. Third, the effective resolution of acquired data is 12 bits, while the DSP 21 is capable of processing 16-bit wide data.

During a non-effective scanning period, the DSP 21 sequentially receives, via bus lines, high temperature detection data for 200 sensor elements, which is obtained by scanning the high-temperature reference heat source 10. The DSP 21 loads each incoming data to its A-Register (AR) 24 (Step A1). It then loads memory data, which is initially zero, from a relevant address of the RAM 23 to its B-Register (BR) 25 (Step A2). Using its integral ALU 28, the DSP 21 calculates the sum of AR and BR (Step A3). Since the resultant value is found in the A-Register 24 (i.e., AR←EAR+BR), the value is transferred back to the RAM 23 (Step A4). The above four steps are repetitively executed for 16 lines, and as a result, the data accumulated in the RAM 23 shows the sum of sixteen samples for each pixel (or sensor element).

The DSP 21 now reads out a summation value stored in the RAM 23 to load the A-Register 24. It then shifts the A-Register 24 by four bits to the right direction (Step A5). This means that the loaded summation value is divided by 16, and the resultant value is the average of sixteen samples of high temperature detection data. The DSP 21 saves this average value to the RAM 23 (Step A6), which will be referred to as "high-temperature reference data." The above two steps A5 and A6 are repeated for 200 pixels in total.

Similar to the high-temperature heat source 10, the normal-temperature reference heat source 11 is scanned 16 times during the non-effective scanning period. Via the bus lines, the DSP 21 sequentially receives the resulting normal-temperature detection data for 200 sensor elements. It loads each incoming data to the A-Register (AR) 24 (Step A7), and loads memory data, which is initially zero, from a relevant address of the RAM 23 to the B-Register (BR) 25 (Step A8). Using its integral ALU 28, the DSP 21 calculates the sum of AR and BR (Step A9). Since the resultant value is set in the A-Register 24 (i.e., AR←AR+BR), the DSP 21 saves it into the RAM 23 (Step A10). The above four steps, A7 to A10, are repetitively executed for 16 lines. As a result, the data accumulated in the RAM 23 shows the sum of sixteen samples for each pixel (or sensor element).

From the RAM 23, the DSP 21 reads out the summation value of a specific pixel and loads it the A-Register 24. It then shifts the A-Register 24 by four bits to the right direction, meaning that the loaded summation value is divided by 16 (Step A11). The resultant value is the average of sixteen samples of normal temperature detection data. The DSP 21 saves this average value to the RAM 23 (Step A12), which will be referred to as "normal-temperature reference data." Again, the above steps A11 and A12 are repeated for 200 pixels in total.

The above-described averaging process will reject unwanted noises and other interference that possibly affect the quality of high-temperature and normal-temperature reference data. Regarding the execution time of the above steps, the DSP 21 executes the steps A1 to A12 in one machine cycle for each, while it consumes six machine cycles to calculate high-temperature or normal-temperature reference data of each pixel.

Figure 5:
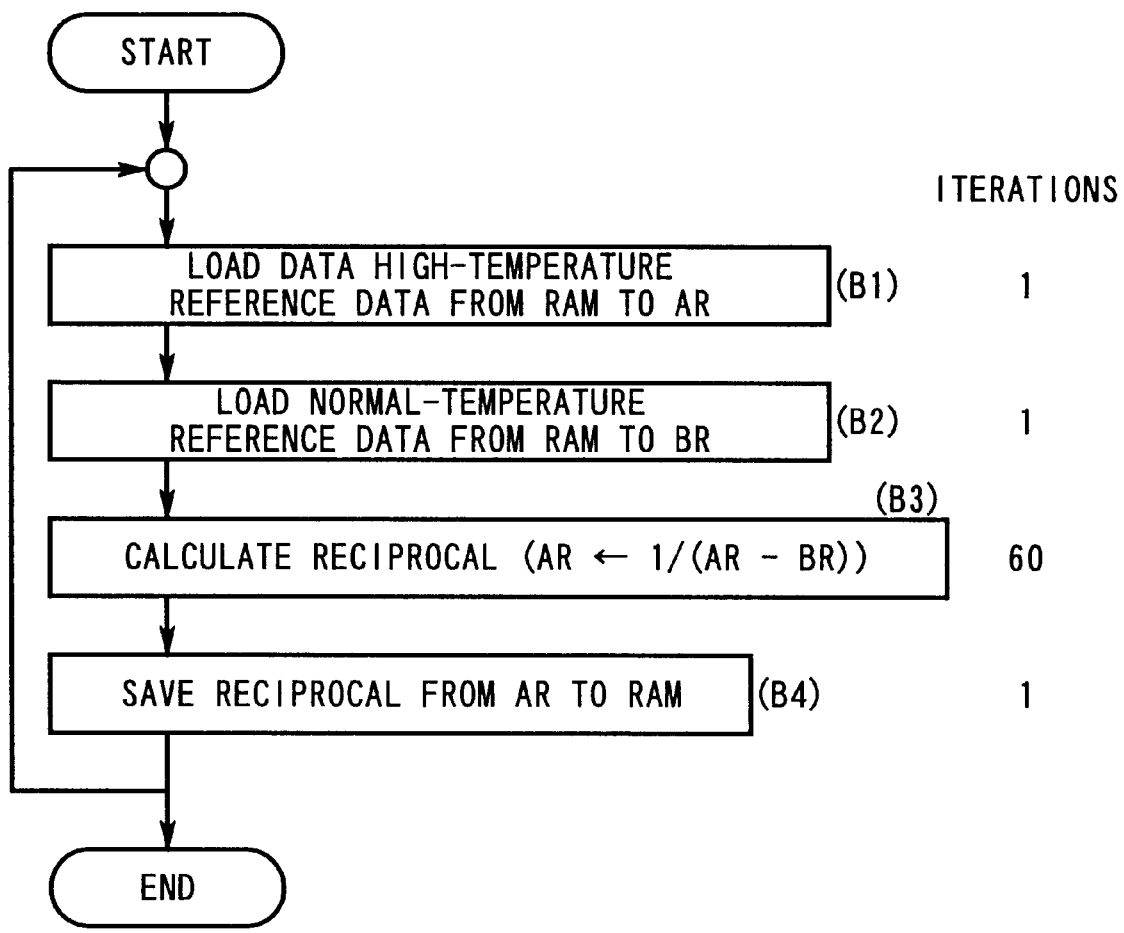
FIG. 5 is a flowchart which shows a process to calculate sensitivity correction coefficients.

FIG. 5 is a flowchart which shows a process to calculate sensitivity correction coefficients. The DSP 21 makes access to the RAM 23 to read out the high-temperature reference data of a specific pixel, and then loads it to the A-Register (AR) 24 (Step B1). Also, the DSP 21 reads the normal-temperature reference data from the RAM 23 and loads it to the B-Register (BR) 25 (Step B2). It then calculates the reciprocal of (AR−BR) (Step B3). The result, being set in the A-Register 24, is then transferred back to the RAM 23 (Step B4). The above steps B1 to B4 are repeated for each pixel.

In this way, the sensitivity coefficient of each pixel is obtained by calculating 1/(Th−Tn), where Th is high-temperature reference data, and Tn is normal-temperature reference data. The time (or machine cycles) required for this calculation is shown on the right-hand side of FIG. 5.

Figure 6:
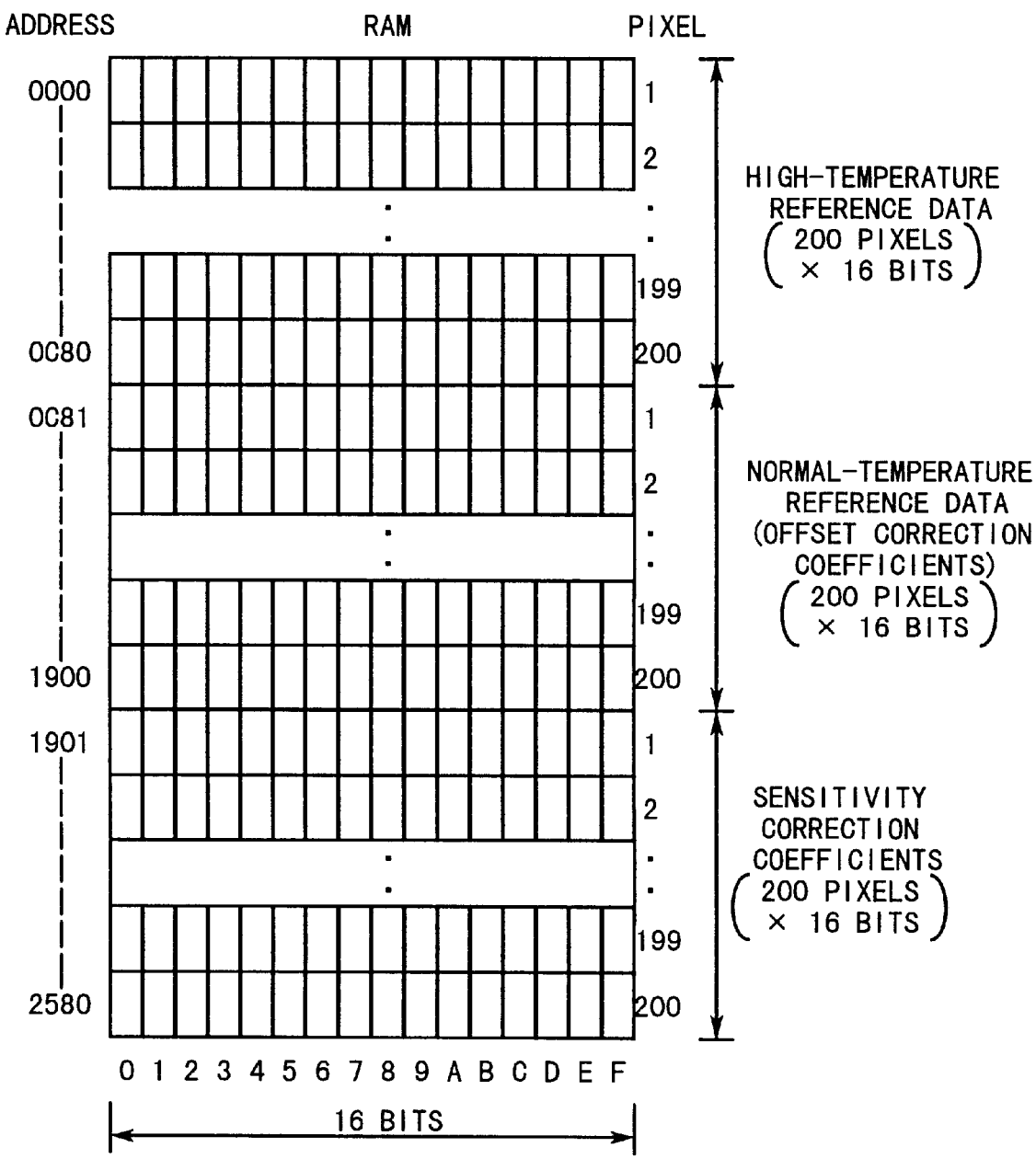
FIG. 6 is a diagram which shows the contents of RAM.

Referring now to FIG. 6, the contents of the RAM 23 will be clarified. As a result of the above-described processes, three data sets are created in the RAM 23, which include: high-temperature reference data, normal-temperature reference data, and sensitivity correction coefficients. Each data set contains 200 components which correspond to individual pixels (or sensor elements), each component being a 16-bit variable. This 16-bit wide storage area allows sixteen samples to be accumulated therein, when calculating the average values of 12-bit high-temperature and normal-temperature reference detection data.

Figure 7:
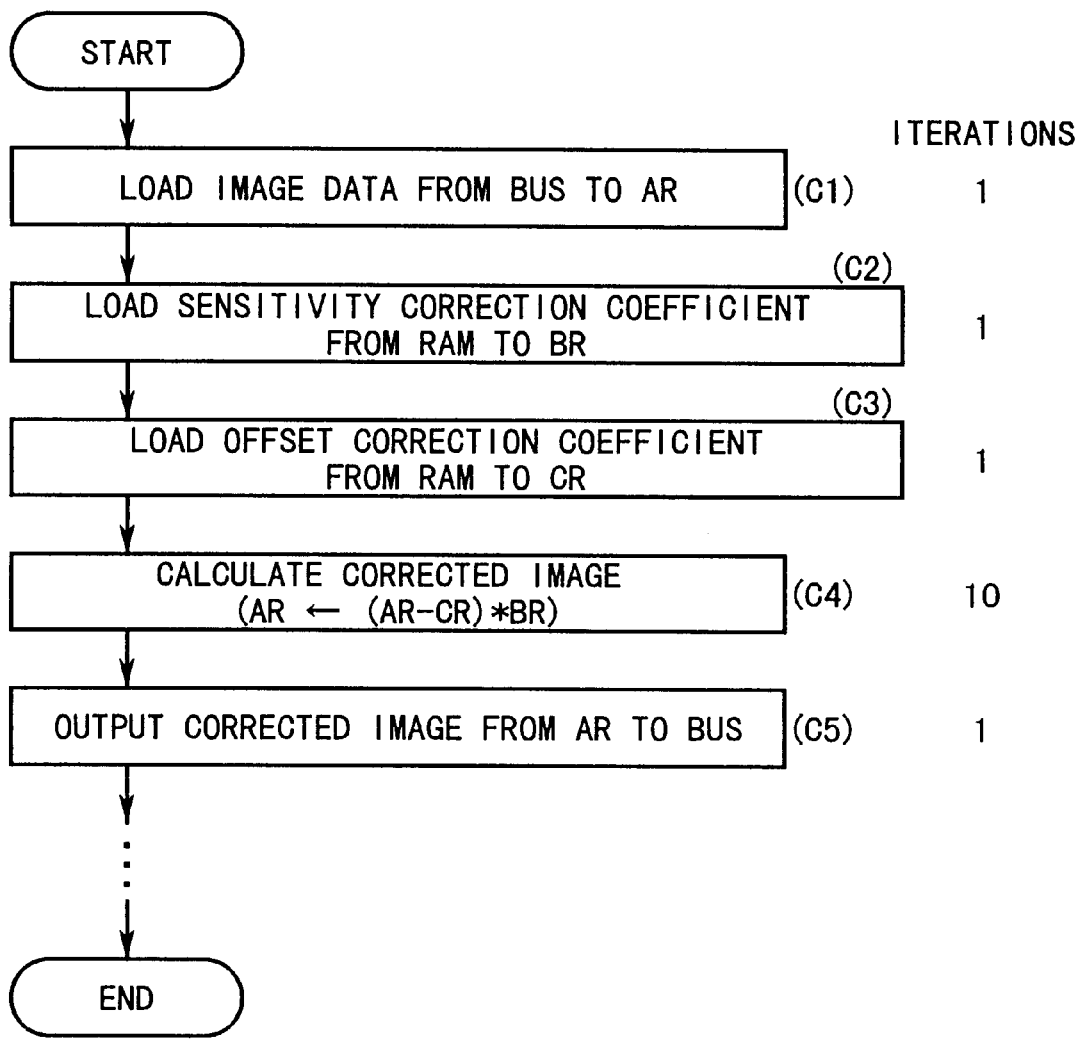
FIG. 7 is a flowchart of a sensitivity correction process.

FIG. 7 is a flowchart which shows a typical sensitivity correction process. During each effective scanning period, the DSP 21 in the sensitivity correction circuit 6a receives digital image data converted by the A/D converter 5. The DSP 21 loads each incoming data into its A-Register (AR) 24 (Step C1). In addition, it reads out a relevant sensitivity correction coefficient from the RAM 23 and sets it to the B-register (BR) 25 (Step C2). It further reads out a relevant offset correction coefficient, which equals the normal-temperature reference data, from the RAM 23 and sets it to the C-register (CR) 26 (Step C3). Sensitivity correction is now accomplished by executing the operation of AR← ((AR−CR)×BR), where the arrow represents substitution (Step C4). The corrected image data in AR is then sent out to the D/A converter 7 (Step C5). The above steps C1 to C5 are repeated for each pixel. Regarding the execution time of those steps, the DSP 21 executes the steps C1, C2, C3, and C5 in one machine cycle for each, while it consumes ten machine cycles at step C4.

Figure 8:
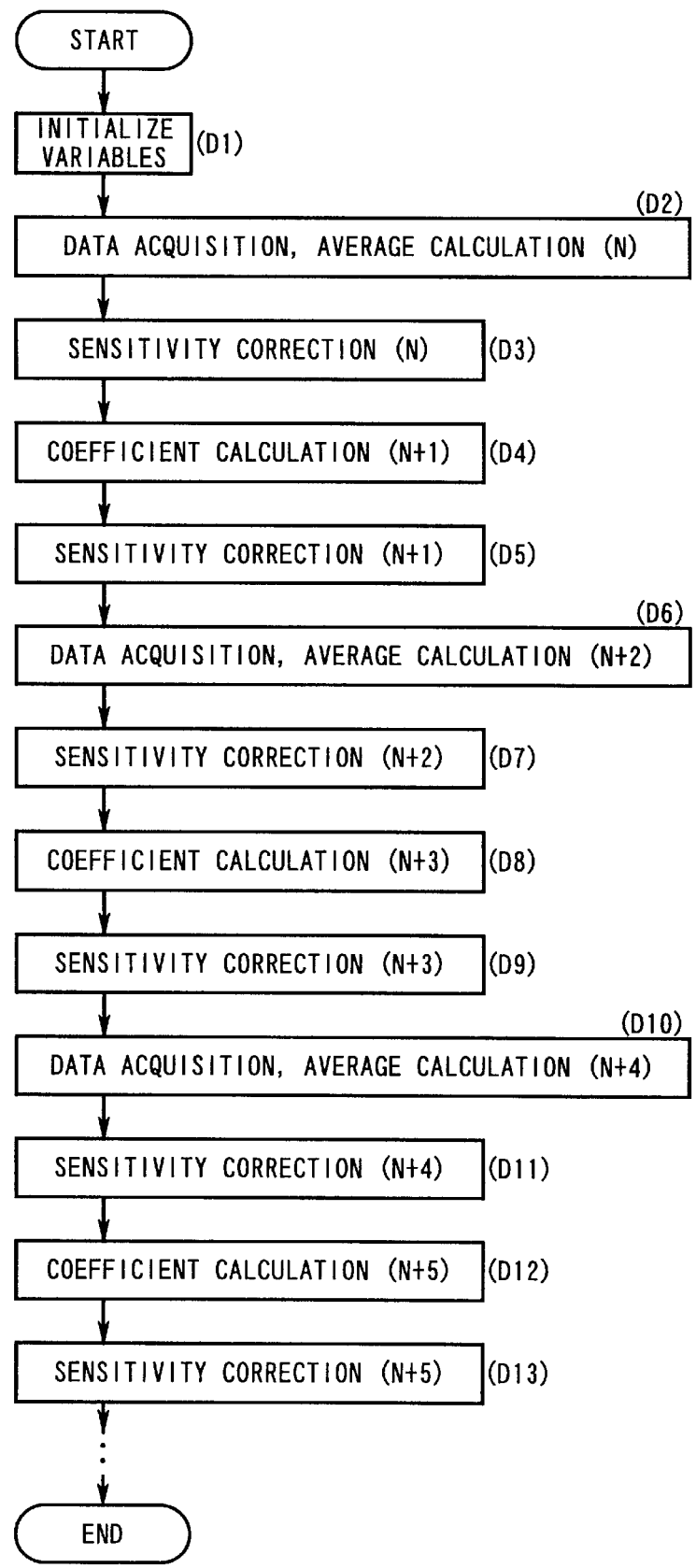
FIG. 8 is a flowchart which shows the operation of the first embodiment.

FIG. 8 is a flowchart which represents the total operation of the first embodiment. The following section will explain each step, referring also to the sequence diagram of FIG. 3.

The infrared imaging system first initializes itself by clearing its internal functional units and setting an initial value to its control word (CW) (Step D1). During the non-effective scanning period of field (N), the system acquires detection data of reference heat sources and calculates their average values (Step D2). In the effective scanning period of the same field (N), the system performs sensitivity correction by using sensitivity correction coefficients obtained in the previous field's non-effective scanning period (Step D3). In the non-effective scanning period of the next field (N+1), the system calculates sensitivity correction coefficients from the data acquired in the non-effective scanning period of the previous field (N) (Step D4). The calculated coefficients are used in the effective scanning period of the same field (N+1) to compensate for sensitivity variations (Step D5).

Now, in the non-effective scanning period of field (N+2), the system acquires new data of reference heat sources and calculates their average values (Step D6). In the effective scanning period of that field (N+2), however, it performs sensitivity correction still with the coefficients obtained in the non-effective scanning period of the previous field (N+1) (Step D7).

Similarly, the system calculates sensitivity correction coefficients (Step D8) in the non-effective scanning period of field (N+3), performs sensitivity correction in the effective scanning period of the same field (N+3) (Step D9), and acquires new reference temperature detection data to calculate their average values (Step D10) in the non-effective scanning period of field (N+4). Further, the system performs sensitivity correction (Step D11) in the effective scanning period of the same field (N+4), calculates sensitivity correction coefficients (Step D12) in the non-effective scanning period of the next field (N+5), and performs sensitivity correction (Step D13) in the effective scanning period of the same field (N+5).

Figure 9:
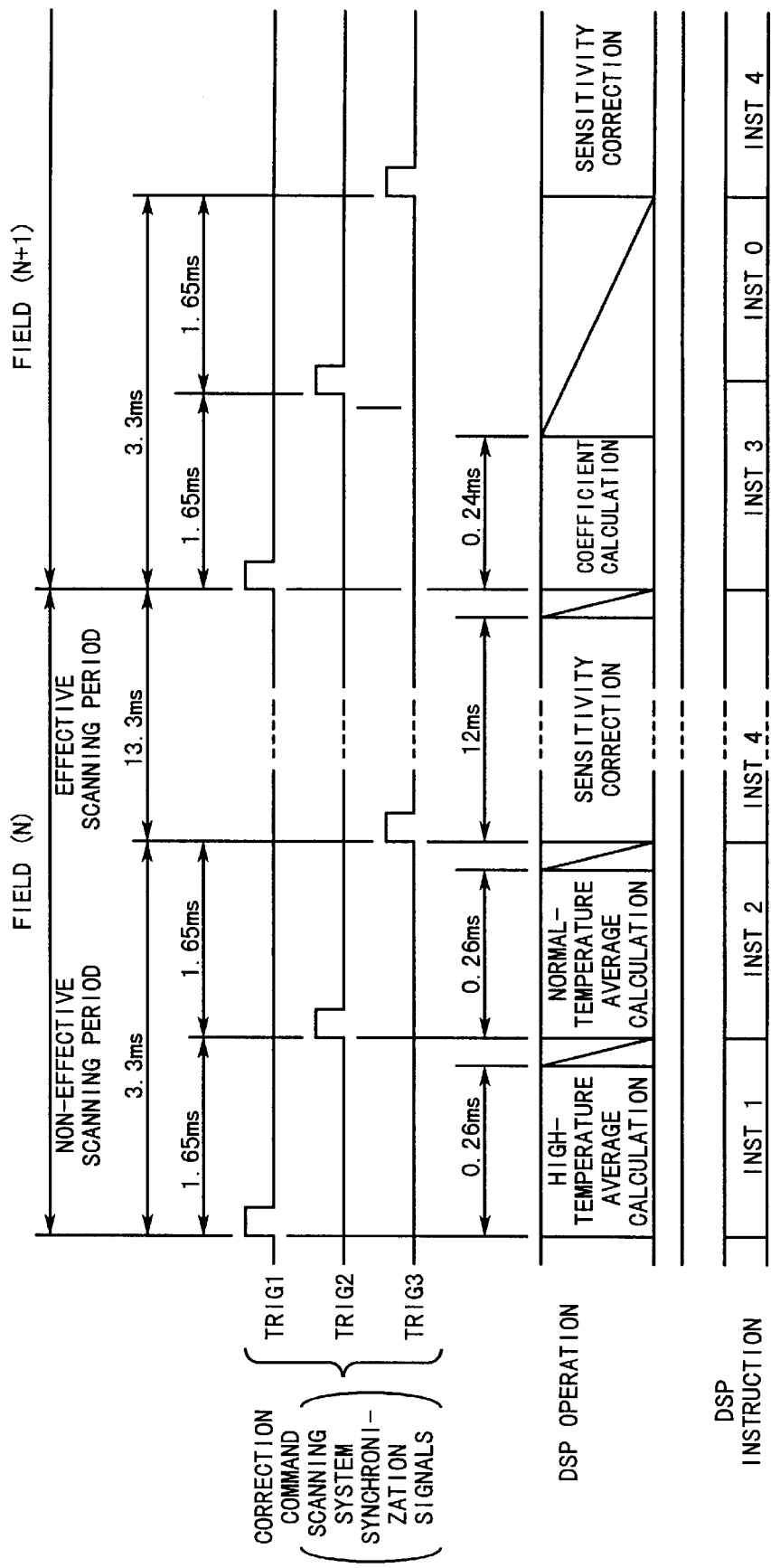
FIG. 9 is a timing diagram of the sensitivity correction sequence controller of the first embodiment.

FIG. 9 is a timing diagram which shows how the system of the first embodiment will operate in two fields (N) and (N+1). The proposed system updates the sensitivity correction coefficients at the rate of 30 times a second and performs sensitivity correction at the rate of 60 times a second. When the effective scanning time ratio is 80 percent, this system's effective scanning period is calculated as $$(1/60) \times 0.8 \cong 13.3 \, [\text{ms}]$$

This means that the system must finish the calculation for sensitivity correction within this limited period of 13.3 ms. Likewise, since the non-effective scanning period is $$(1/60) \times 0.2 \cong 3.3 \, [\text{ms}],$$

the system must finish the calculation of sensitivity correction coefficients within 3.3 ms.

To initiate each calculation process at proper timings, the optical system 2 (FIG. 1) provides the sensitivity correction sequence controller 13 with three different trigger signals TRIG1, TRIG2, and TRIG3, which are produced on the basis of target scan timings. More specifically, the first trigger signal TRIG1 is generated at the beginning of the non-effective scanning period of every field. Take field (N) for example. Being stimulated by the TRIG1 signal, the DSP 21 starts to sample the high-temperature reference heat source 10 and calculates average values of 16-line samples according to an instruction INST1. After a delay of 1.65 ms, the second trigger signal TRIG2 occurs, making the DSP 21 start to sample the normal-temperature reference heat source 11 according the next instruction INST2. The third trigger signal TRIG3 is generated at the beginning of the effective scanning period of each field. FIG. 9 illustrates that the DSP 21 initiates a sensitivity correction process by executing still another instruction INST4 in response to the TRIG3 signal. This process adjusts the target object's infrared image being captured during that effective scanning period.

In the next field (N+1), the first trigger signal TRIG1 invokes the execution of INST3, which makes the DSP 21 calculate sensitivity correction coefficients. The second trigger signal TRIG2 causes nothing to happen, since the instruction INST0 invoked by the TRIG2 signal is a "No Operation (NOP)" instruction. The third trigger signal TRIG3 initiates a sensitivity correction process by according to an instruction INST4 as in the field (N).

Now, the following discussion will focus on the execution time consideration in the first embodiment of the present invention.

Suppose here that the infrared imaging system uses a general purpose DSP device with the cycle time of 20 ns. It is also assumed that the DSP spends four machine cycles to acquire one data word from the infrared sensor and two machine cycles to make a 4-bit shift operation. The DSP samples 16 lines in each reference temperature measurement, and the infrared sensor contains 200 sensor elements. In such a situation, the time required for the reference data acquisition including averaging operations is determined as follows.

20 ns×(4 cycles×200 elements×16 lines+2 cycles×200 elements)= 264,000 ns

This indicates that it only takes about 0.26 ms for the DSP to process the acquired reference data. Accordingly, the high-temperature and normal-temperature reference data can be obtained in 0.52 ms, meaning that the calculation can be finished within a non-effective scanning period of 3.3 ms.

About the sensitivity correction coefficients, the DSP needs 60 machine cycles for reciprocal calculation as shown in step B3 of FIG. 5. Therefore, the required computation time is as follows.

20 ns×(60 cycles×200 elements)=240,000 ns=0.24 ms

This indicates that the DSP can complete the required calculation within a non-effective scanning period of 3.3 ms.

In addition, the time for sensitivity correction is calculated as follows, assuming that the DSP needs 10 machine cycles for each sensor element as shown in step C4 of FIG. 7.

20 ns×(10 cycles×200 elements)×300 lines=12,000,000 ns=12 ms

This also shows that the DSP can complete the required calculation safely within an effective scanning period of 13.3 ms.

Figure 10:
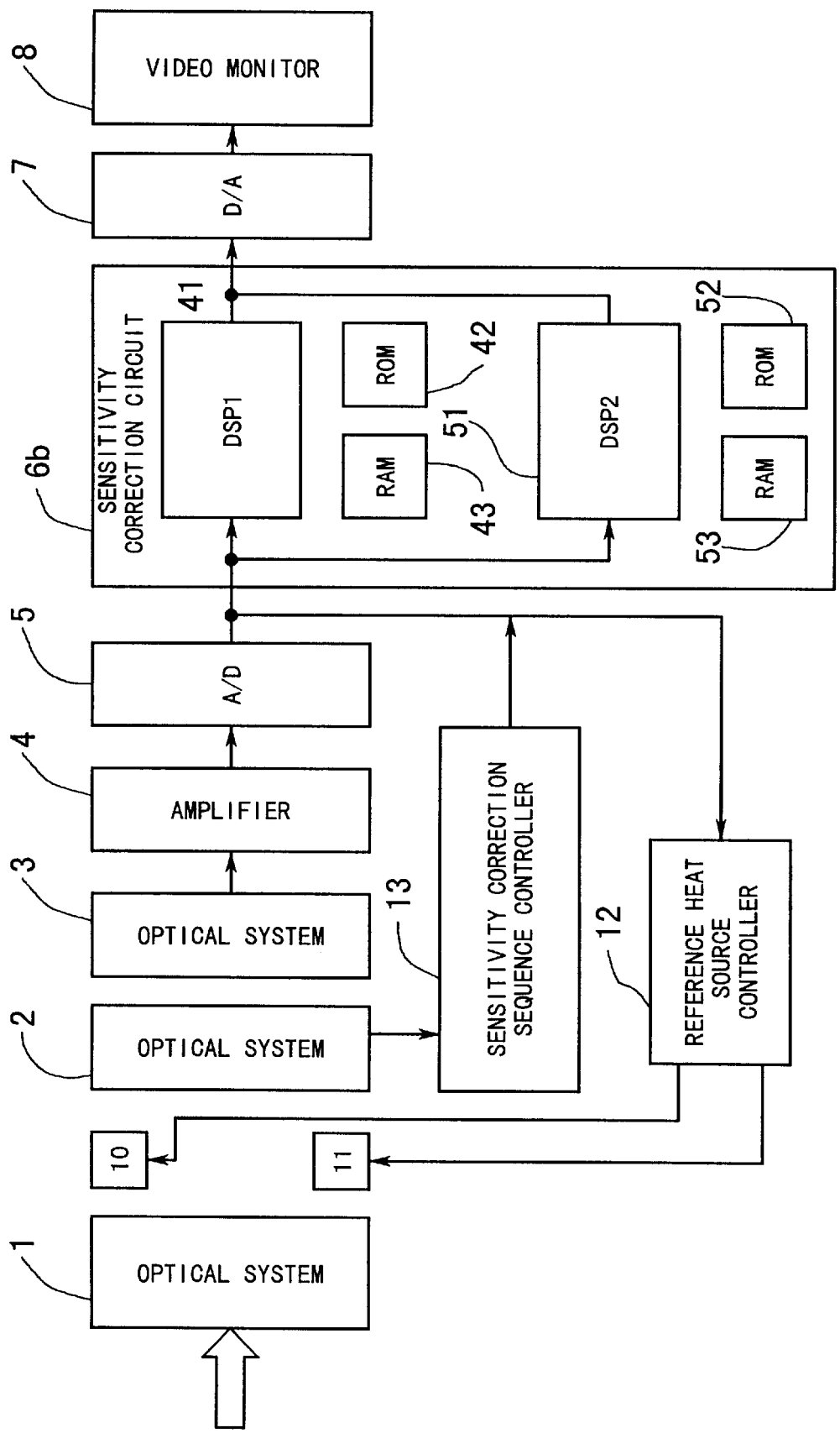
FIG. 10 is a diagram which shows a second embodiment of the present invention.

Referring next to FIG. 10, the following section will describe a second embodiment of the present invention. Since this second embodiment has basically the same structure as the first embodiment of FIG. 1, like reference numerals are affixed to like elements. The second embodiment, however, differs from the first embodiment in the internal structure of its sensitivity correction circuit 6b. More specifically, the sensitivity correction circuit 6b comprises a first digital signal processor (DSP1) 41, a second digital signal processor (DSP2) 51, a first and second read-only memory (ROM) devices 42 and 52, and a first and second random access memory (RAM) devices 43 and 53.

In other words, the sensitivity correction circuit 6b of the second embodiment is equipped with two sets of DSP 21, ROM 22, and RAM 23 of FIG. 1. Thanks to this dual processor configuration, one DSP can execute a sensitivity correction process, while the other DSP calculates sensitivity correction coefficients. This allows the sensitivity correction coefficients to be updated at faster rates (e.g., 60 times per second, or at every field), meaning that more precise infrared images can be displayed on the monitor 8.

Figure 11:
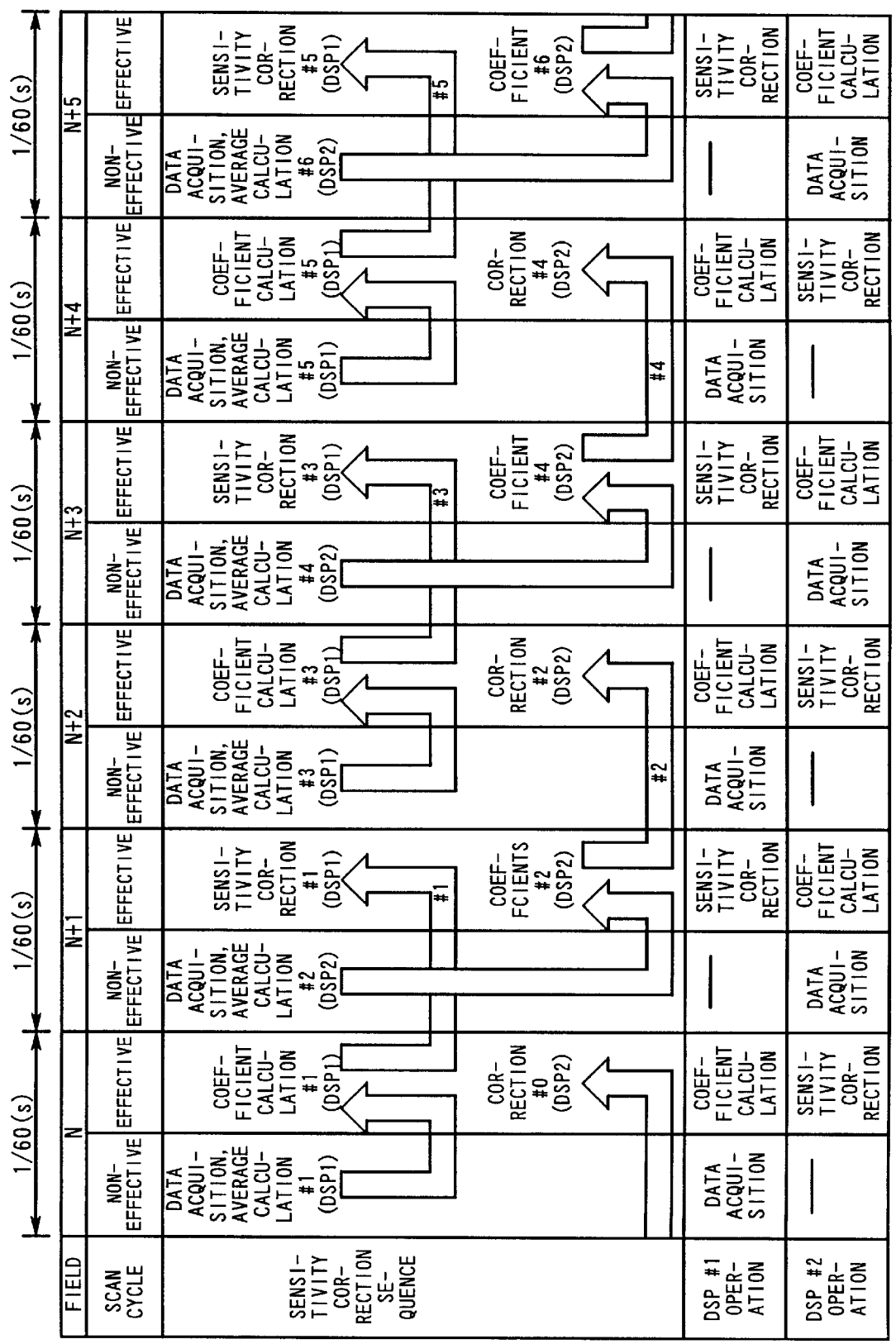
FIG. 11 is a diagram which shows an operation sequence of the second embodiment.

FIG. 11 is a sequence diagram showing how the system operates in the second embodiment. Here, scanning cycle is synchronized with the video field that proceeds at intervals of 1/60 second. FIG. 11 shows how the sensitivity correction sequence proceeds in conjunction with the operation of DSP1 and DSP2, during a series of fields N, N+1, N+2, and so on.

In the non-effective scanning period of field (N), infrared detection signals are obtained by scanning two reference heat sources 10 and 11, and the A/D converter 5 converts them into digital form. The DSP1 acquires this digital data and calculates average values #1 of multiple samples of the high and normal reference temperatures. With these average values #1, the DSP1 then calculates sensitivity correction coefficients #1 during the same non-effective scanning period of field (N).

The other processor DSP2 is in idle state in this non-effective scanning period of field (N). When the effective scanning period comes, the DSP2 executes a sensitivity correction process by using sensitivity correction coefficients calculated in the preceding field (N−1). In the non-effective scanning period of the next field (N+1), the DSP2 acquires detection data to calculate their average values #2. The calculated average values #2 are immediately subjected to the calculation of sensitivity correction coefficients #2 in the subsequent effective scanning period of the same field (N+1).

The DSP1, on the other hand, stays in idle state in the non-effective scanning period of field (N+1). When the effective scanning period comes, the DSP1 executes a sensitivity correction process by using the sensitivity correction coefficients #1 that have been calculated during the effective scanning period of the preceding field (N). In this way, the DSP1 and DSP2 work in concert with each other to accomplish realtime sensitivity correction. Note that the two processors alternately execute a sensitivity correction process by using sensitivity correction coefficients that have been calculated in the effective scanning period of the preceding field.

Figure 12:
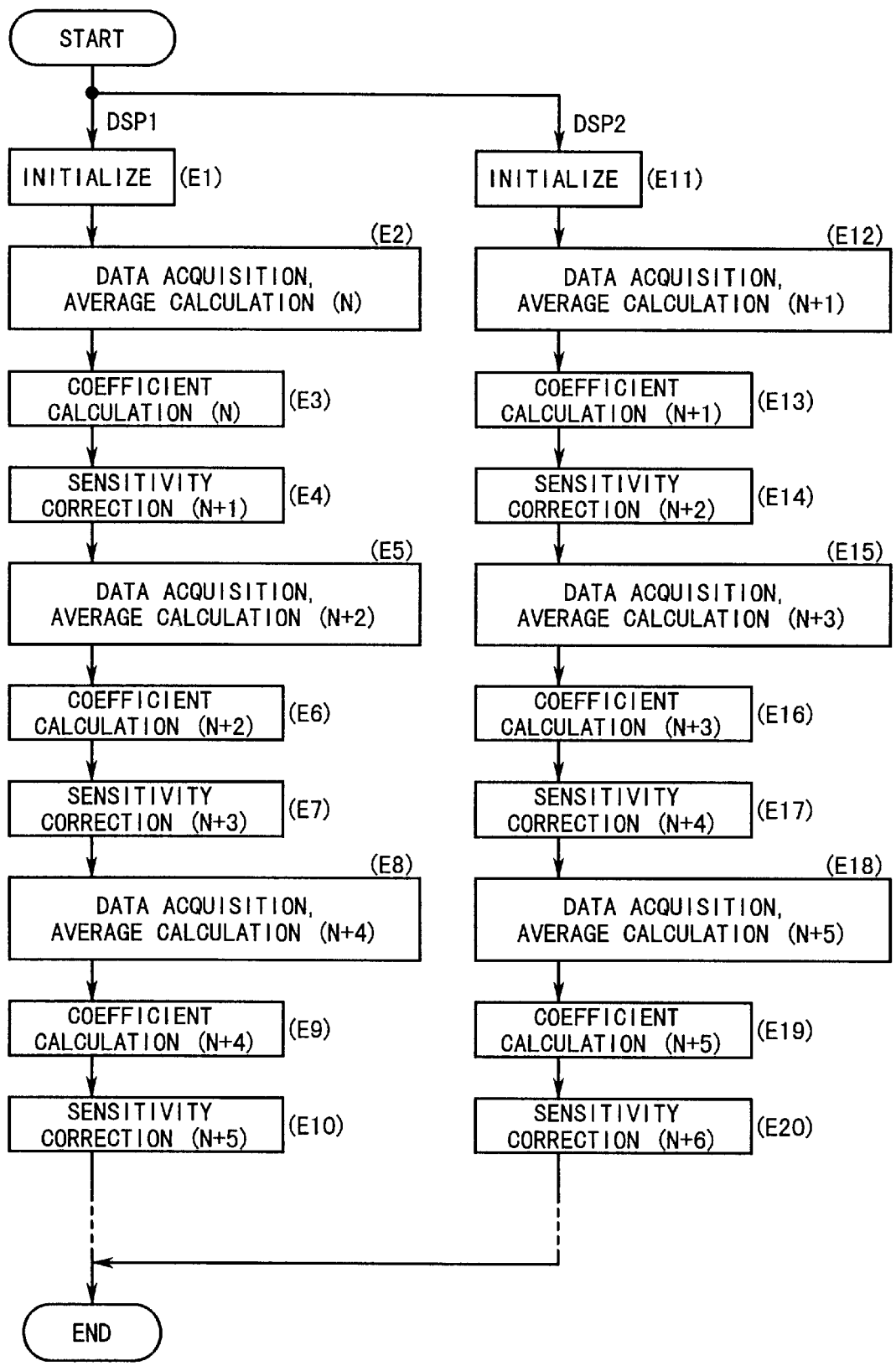
FIG. 12 is a flowchart which shows the operation of the second embodiment.

FIG. 12 is a flowchart which shows the operation of the second embodiment. During a series of fields (N) to (N+6), the DSP1 executes steps E1 to E10, while the DSP2 executes steps E11 to E20 in a parallel fashion.

The DSP1 and DSP2 first initialize themselves by clearing their internal functional units and setting appropriate initial values to their respective control words (CW) (Steps E1 and E11). The DSP1 acquires reference temperature detection data and calculates their average values (Step E2) in the non-effective scanning period of field (N). In the subsequent effective scanning period of the same field (N), the DSP1 calculates sensitivity correction coefficients (Step E3), and in the effective scanning period of the next field (N+1), it performs sensitivity correction (Step E4). As in step E2, the DSP1 acquires new reference temperature detection data and calculates their average values (Step E5) in the non-effective scanning period of field (N+2). In the subsequent effective scanning period of the same field (N+2), the DSP1 calculates sensitivity correction coefficients (Step E6).

In the way described above, the DSP1 uses the non-effective scanning period of every even-numbered field to collect reference temperature detection data and calculate their average values, and spends the subsequent effective scanning period to calculate sensitivity correction coefficients. Also, the DSP1 consumes the effective scanning period of every even-numbered field to execute a sensitivity correction process by using the sensitivity correction coefficients calculated in the last even-numbered field.

The DSP2, on the other hand, acquires reference temperature detection data and calculates their average values (Step E12) in the non-effective scanning period of field (N+1). In the subsequent effective scanning period of the same field (N+1), the DSP2 calculates sensitivity correction coefficients (Step E13). With the calculated coefficients, the DSP2 performs sensitivity correction (Step E14) in the effective scanning period of the next field (N+2).

In this way, the DSP2 consumes the effective scanning period of every even-numbered field to execute a sensitivity correction process by using the coefficients calculated in the last odd-numbered field. Also, the DSP2 uses the non-effective scanning period of every odd-numbered field to collect new reference temperature detection data and calculate their average values, and spends the subsequent effective scanning period to update the sensitivity correction coefficients.

Figure 13:
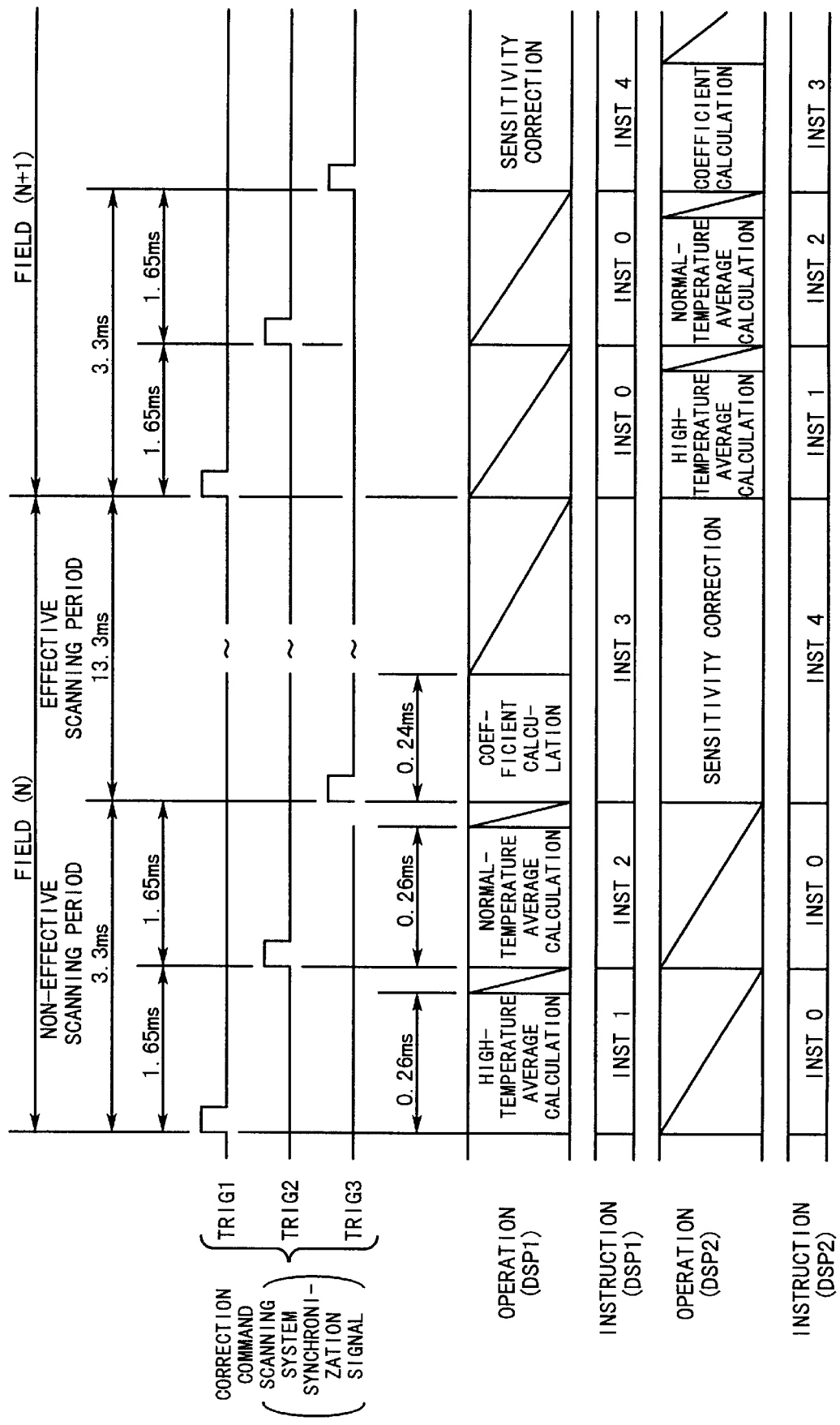
FIG. 13 is a timing diagram which shows the operation of a sensitivity correction sequence controller of the second embodiment.

FIG. 13 is a timing diagram which shows how the sensitivity correction sequence controller 13 operates in the second embodiment. More specifically, FIG. 13 illustrates the timings of trigger signals TRIG1 to TRIG3, together with the operation and instructions of DSP1 and DSP2 in two consecutive fields (N) and (N+1). Here, INST0 to INST4 are instructions given to the DSP1 and DSP2 in different circumstances. With the same scan timings as those in FIG. 9 assumed, the effective scanning period is 13.3 ms and the non-effective scanning period is 3.3 ms.

The first trigger signal TRIG1 is generated at the beginning of the non-effective scanning period of every field. In field (N), the DSP1 responds to TRIG1 by starting to sample the high-temperature reference heat source 10, and then it calculates their average values according to an instruction INST1. During this period, the DSP2 stays in idle state according to INST0, or NOP instruction. Upon reception of the next trigger signal TRIG2, the DSP1 executes INST2, thereby collecting detection data of the normal-temperature reference heat source 11 to calculate their average values. The DSP2 is still in idle state because of the continuing INST0 (NOP) instruction. When the third trigger signal TRIG3 is activated at the beginning of the next effective scanning period, the DSP1 starts to calculate sensitivity correction coefficients according to INST3. At the same time, the DSP2 performs sensitivity correction as requested by INST4.

Now, the field has advanced to (N+1). In its non-effective scanning period, the DSP1 executes INST0, thus falling into idle state. On the other hand, the DSP2 is stimulated by the trigger signal TRIG1, and according to INST1, it starts acquisition of infrared detection data of the high-temperature reference heat source 10 to calculate their average values. When the next trigger signal TRIG2 is activated, the DSP2 does the same for the normal-temperature reference heat source 11 according to INST2. When TRIG3 is generated at the beginning of the subsequent effective scanning period, the DSP1 commences a sensitivity correction process according to INST4. At the same time, the DSP2 starts to calculate sensitivity correction coefficients for use in the next field, according to INST3.

With respect to the individual computation times, the second embodiment is similar to the first embodiment. That is, it only takes 0.26 ms for the DSPs to process the acquired data to obtain each of the high-temperature reference data and normal-temperature reference data. This means that the sensitivity correction circuit 6b can finish the calculation of either reference data within one half (i.e., 1.65 ms) of non-effective scanning period. Sensitivity correction coefficients can also be calculated safely within an effective scanning period of 13.3 ms, because it takes only 0.24 ms as in the first embodiment. It should be noted, however, that the second embodiment has an advantage over the first embodiment in that the sensitivity correction coefficients are updated at every 1/60 of a second, or at every field. This improves the response of the sensitivity correction mechanism, thus enabling it to follow a moving object or rapid changes in temperature distribution.

Figure 14:
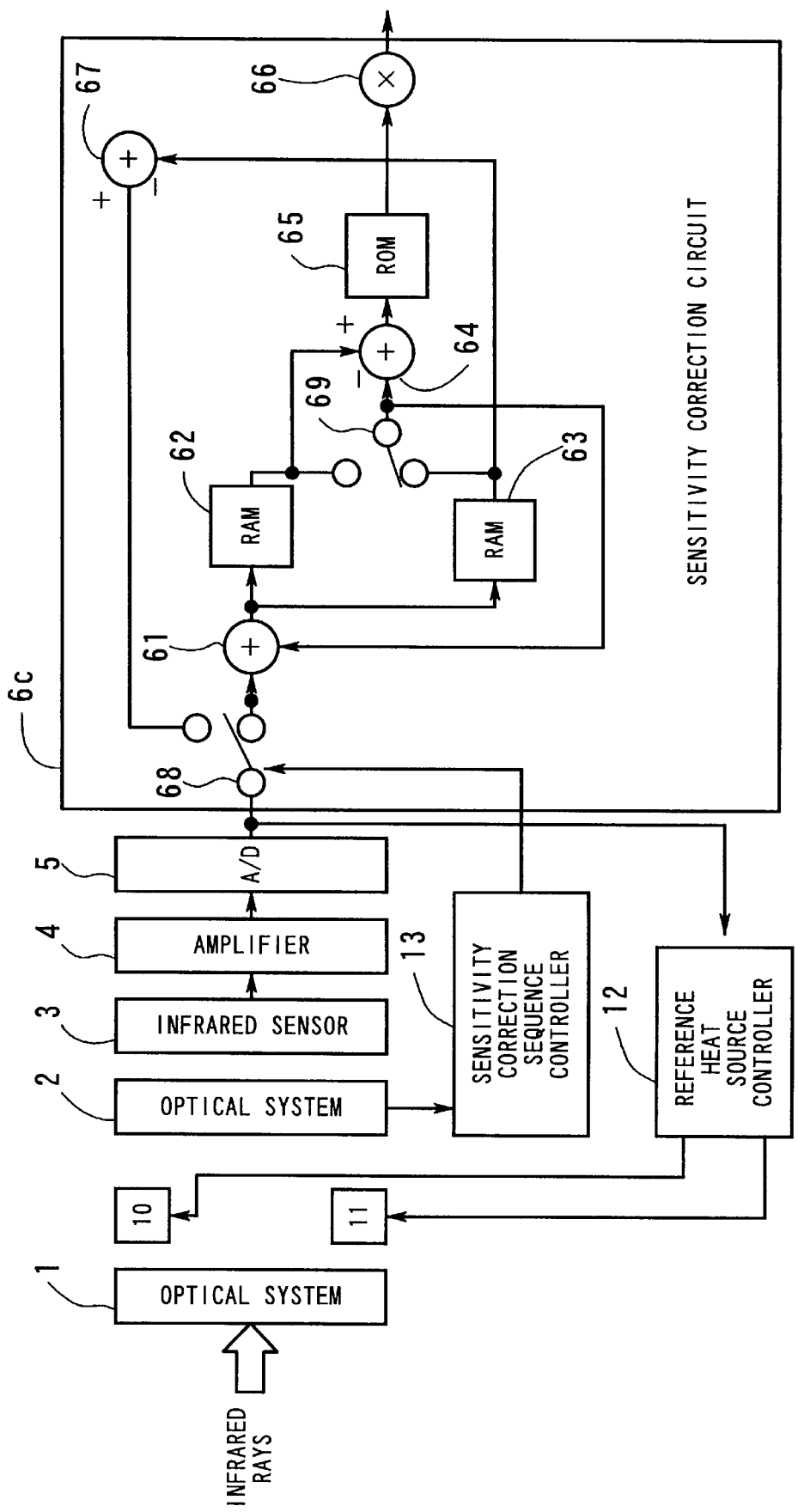
FIG. 14 is a diagram which shows a third embodiment of the present invention.

Referring next to FIG. 14, a third embodiment of the present invention will be described below. Since this third embodiment has basically the same structure as the first embodiment of FIG. 1, like reference numerals are affixed to like elements appearing in FIG. 14. The third embodiment, however, differs from the first embodiment in the internal structure of its sensitivity correction circuit 6c. More specifically, the sensitivity correction circuit 6c comprises the following functional elements: an adder 61, two subtractors 64 and 67, a RAM 62 for high-temperature reference data, another RAM 63 for normal-temperature reference data, a sensitivity table ROM 65, a multiplier 66, and two switches 68 and 69.

Under the control of the sensitivity correction sequence controller 13, the switch 68 is set to the illustrated position when the sensitivity correction circuit 6c collects high-temperature and normal-temperature reference detection data from the infrared sensor 3. It will be changed to the other position when a sensitivity correction process is actually applied to the input object image. On the other hand, the switch 69 is set to the illustrated position when collecting detection data of the normal-temperature reference heat source 11. This switch position, together with the adder 61, permits the normal-temperature data RAM 63 to work as an accumulator. More specifically, sixteen samples of detection data obtained from each sensor element by repetitively scanning the normal-temperature reference heat source 11 are accumulated in the RAM 63. When it is read out, the output data is automatically shifted to the right direction by four bits, thereby producing an average value of the above sixteen samples. This value is referred to as the "normal-temperature reference data." When the switch 69 is set to the other side, the high-temperature reference data RAM 62 and the adder 61 forms another accumulator. As in the normal-temperature data acquisition, sixteen samples obtained by scanning the high-temperature reference heat source 10 are accumulated into the RAM 62. The data read out of this RAM 62 is automatically right-shifted by four bits, which yields a average value of the obtained samples, or "high-temperature reference data."

When the switch 69 is at the position illustrated in FIG. 14, the subtractor 64 receives high-temperature reference data from the RAM 62 and normal-temperature reference data from the RAM 63. The resulting difference value is fed to the sensitivity table ROM 65 to drive its address lines. A sensitivity correction coefficient corresponding to the difference value is read out from the sensitivity table ROM 65 and supplied to the multiplier 66.

In FIG. 14, the sensitivity correction is made by changing the switch 68 to the opposite position so that input image data will be subjected to an offset correction process at the subtractor 67, where the normal-temperature reference data from the RAM 63 serves as offset correction coefficients. This subtractor 67 subtracts the normal-temperature reference data from the input image data. The multiplier 66 then multiplies the result by a relevant sensitivity correction coefficient, thus obtaining a final outcome of the sensitivity correction process. In this way, the sensitivity correction circuit 6c outputs fully corrected infrared image signals to a D/A converter and a video monitor to follow (not illustrated in FIG. 14).

Figure 15:
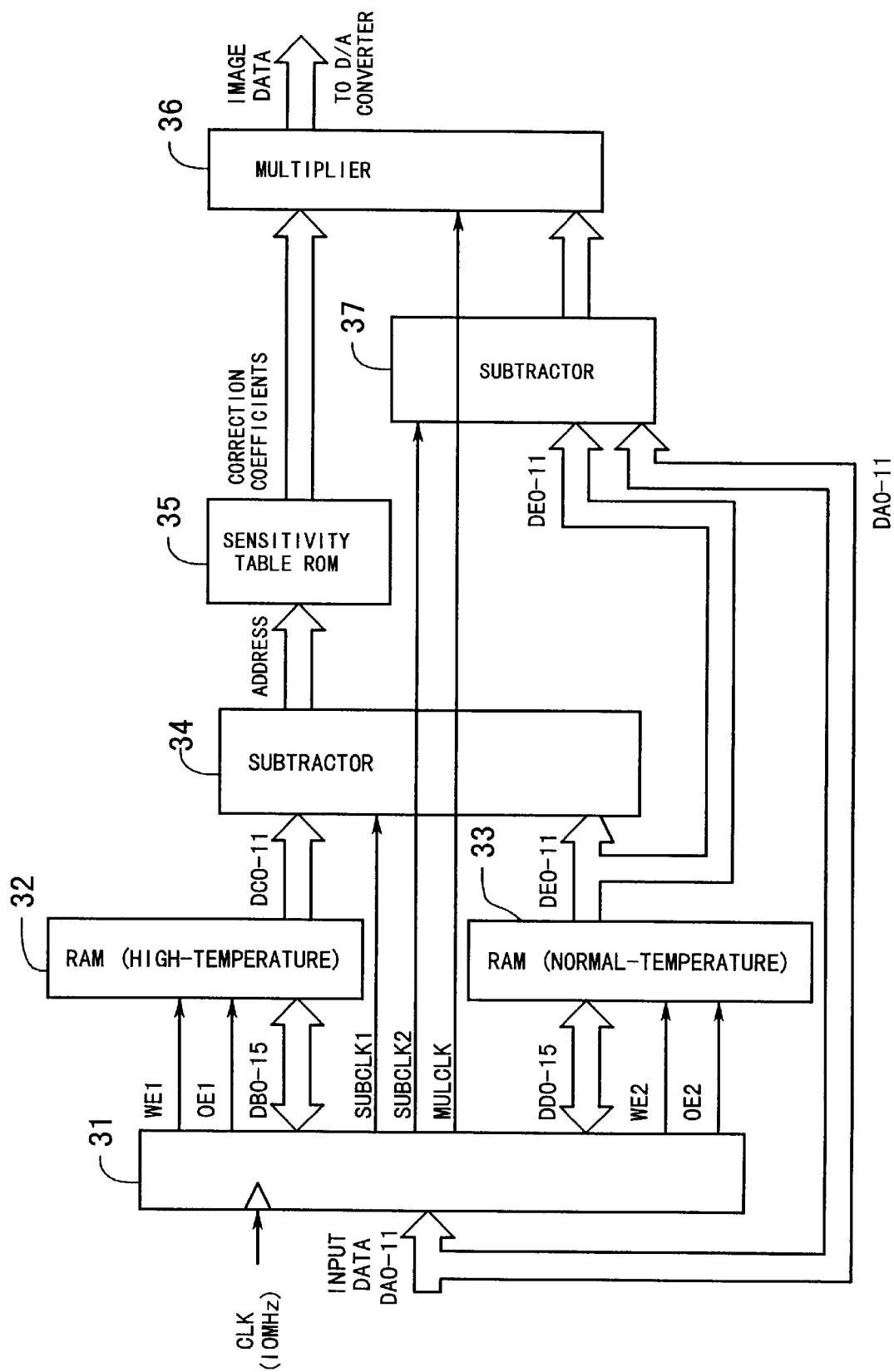
FIG. 15 is a functional block diagram of a sensitivity correction circuit.

FIG. 15 is a functional block diagram showing an implementation of the sensitivity correction circuit 6c of FIG. 14. This circuit comprises the following elements: an adder 31, two subtractors 34 and 37, a RAM 32 for high-temperature reference data, another RAM 33 for normal-temperature reference data, a sensitivity table ROM 35, and a multiplier 36. The RAMs 32 and 33 correspond to the RAM 23 in FIG. 1. The sensitivity table ROM 35 contains sensitivity correction coefficients. The multiplier 36 corresponds to the multiplier 27 in FIG. 1. The adder 31 and subtractors 34 and 37 serve as the ALU 28 in FIG. 1.

Input data lines DA0–DA11 are used to transport 12-bit wide digital image data, including reference temperature data, from the A/D converter 5 (FIG. 1) to the sensitivity correction circuit. Each incoming data is entered to the adder 31 in synchronization with a 10 MHz clock signal, CLK. Besides acting as a summation operator with 16-bit output data lines DB0–DB15, this adder 31 generates some control timing signals, including: write enable signals WE1 and WE2, output enable signals OE1 and OE2, subtraction clock signals SUBCLK1 and SUBCLK2, and a multiplication clock signal MULCLK.

In operation, high-temperature reference detection data obtained in a non-effective scanning period is supplied to the adder 31 through 12-bit input data lines DA0–DA11. The write enable signal WE1 is controlled so that the accumulated data will be written into the RAM 32 via 16-bit data lines DB0–DB15. After repeating the addition for 16 scan lines, the accumulated data is read out of the RAM 32, applying a 4-bit right-shift operation to divide the output by 16. The above operation finally yields the averaged high-temperature reference detection data (i.e., high-temperature reference data) appearing on 12-bit data lines DC0–DC11.

Likewise, detection data of the normal-temperature reference heat source 11 is supplied to the adder 31 through the common input data lines DA0–DA11. The write enable signal WE2 is controlled so that the accumulated detection data will be written into the RAM 33 via 16-bit data lines DD0–DD15. After repeating the addition for 16 scan lines, the accumulated data is read out of the RAM 33, applying a 4-bit right-shift operation to divide it by 16. The above operation finally yields normal-temperature reference data appearing on 12-bit data lines DE0–DE11.

With the output enable signal OE1 activated, 12-bit wide high-temperature reference data is read out of the RAM 32. Likewise, with the output enable signal OE2 activated, 12-bit wide normal-temperature reference data is read out of the RAM 33. These RAM outputs are supplied to the subtractor 34 via the 12-bit data lines DC0–11 and DE0–DE11. The resultant difference between the high-temperature and normal-temperature reference data is given to the sensitivity table ROM 35 as its address input signals. For use as sensitivity correction coefficients, the sensitivity table ROM 35 stores reciprocals of every possible difference value of [(high-temperature reference data)−(normal-temperature reference data)]. That is, when a specific difference value is given to the address input, its reciprocal value will appear at the output of the sensitivity table ROM 35.

The input image data lines DA0–DA11 are connected to the positive input port of the subtractor 37. The negative input port of the subtractor 37 receives normal-temperature reference data DC0–DC11 read out of the RAM 35, which serves as an offset correction coefficient. Accordingly, the subtractor 37 subtracts the offset from the input image data, and supplies the result to the next multiplier 36. During each effective scanning period, the multiplier 36 multiplies the offset-corrected image data by relevant sensitivity correction coefficients, thereby yielding a final sensitivity-corrected image. This fully corrected image is then converted by a D/A converter (not illustrated) into an analog video signal that is suitable for display on a monitor screen (not illustrated).

Referring back to FIG. 14, the sensitivity correction circuit 6c, which is implemented with dedicated hardware, operates with a clock signal of 10 MHz, for example, meaning that its processing cycle time is 100 ns. Since the infrared sensor 3 has 200 sensor elements and each reference temperature is sampled for 16 scan lines, the time required for each of the high and low temperature reference data acquisition is calculated as $$100 \text{ ns} \times (200 \text{ elements} \times 16 \text{ lines}) = 320{,}000 \text{ ns} = 0.32 \text{ ms},$$

where the time of averaging operation is neglected because it is only a simple shift operation. This time estimation indicates that it takes about 0.64 ms in total to yield both high-temperature and normal-temperature reference data.

Regarding the sensitivity correction coefficients for 200 sensor elements, the sensitivity correction circuit 6c spends 0.02 ms to calculate temperature differences, another 0.02 ms to make access to the sensitivity table ROM 65, and still another 0.02 ms to make access to the RAM 63. This means that the coefficient calculation needs 0.06 ms in total. The sensitivity correction circuit 6c consumes about 0.7 ms in all to carry out reference data acquisition and coefficient calculation.

In each sensitivity correction process, the multiplier 66 spends $$100 \text{ ns} \times (200 \text{ elements} \times 300 \text{ lines}) = 6{,}000{,}000 \text{ ns} = 6 \text{ ms}$$

Because the subtractor 67 needs the same processing time, the grand total of time consumption in a sensitivity correction process is 12 ms.

Figure 16:
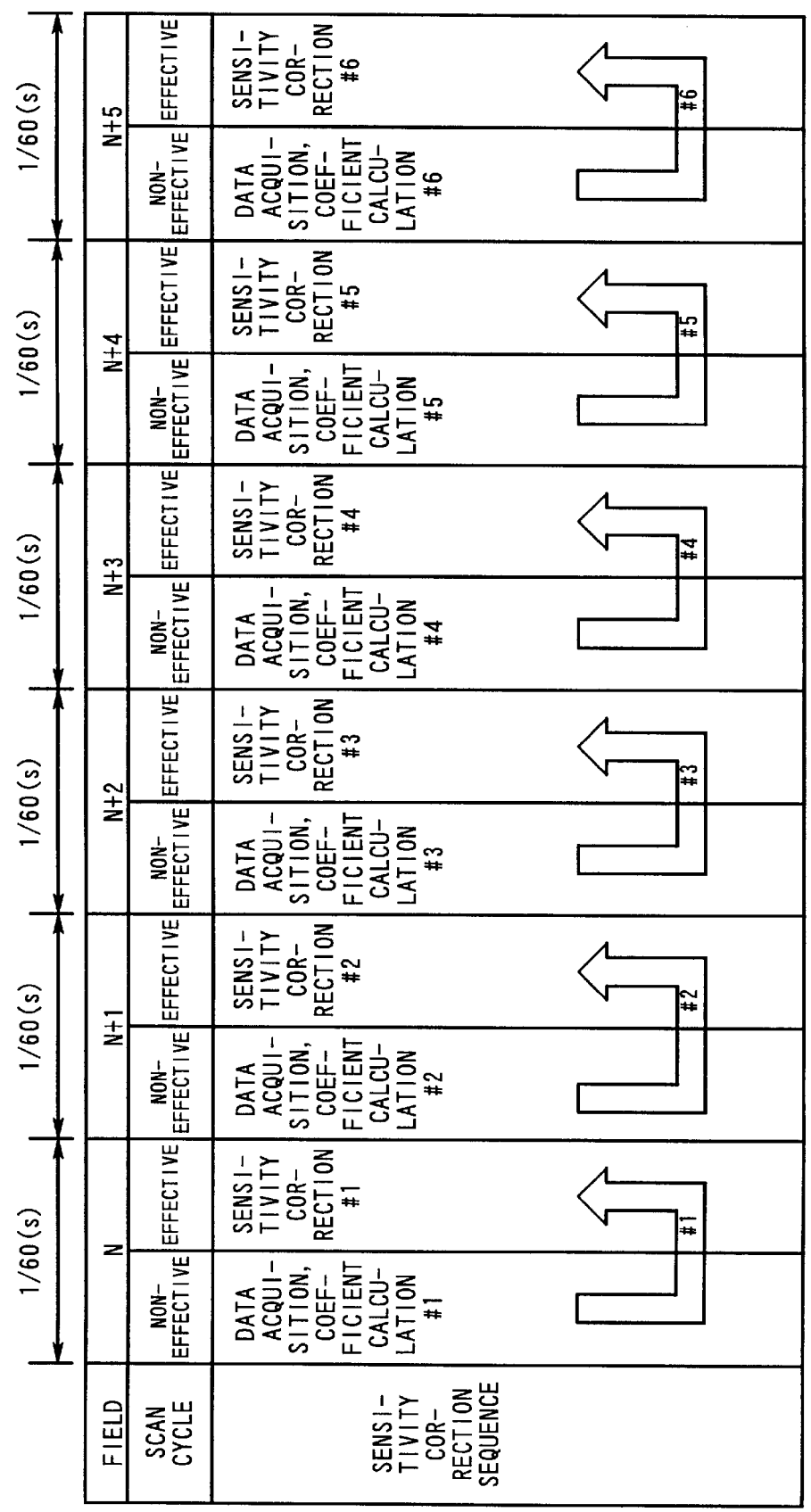
FIG. 16 is a diagram which shows an operation sequence of the third embodiment.

FIG. 16 shows a sequence of the third embodiment of the present invention. Here, scanning cycles proceed at intervals of 1/60 second in synchronization with video fields. FIG. 16 specifically shows how the sensitivity correction sequence proceeds during a series of fields N, N+1, N+2, and so on. In the non-effective scanning period of field (N), the sensitivity correction circuit 6c acquires reference temperature detection data and calculate a set of sensitivity correction coefficients #1. The coefficients #1 are immediately used to correct the captured infrared image in the subsequent effective scanning period. Likewise, in the next field (N+1), the sensitivity correction circuit 6c acquires new detection data in its non-effective scanning period, and calculates another set of sensitivity correction coefficients #2. These coefficients #2 are used in the subsequent effective scanning period to correct the captured infrared image. The sequence continues in the same way. Note that, in the third embodiment, sensitivity correction coefficients are calculated in the non-effective scanning period of every field, and used to correct the captured image in the effective scanning period of the same field.

Figure 17:
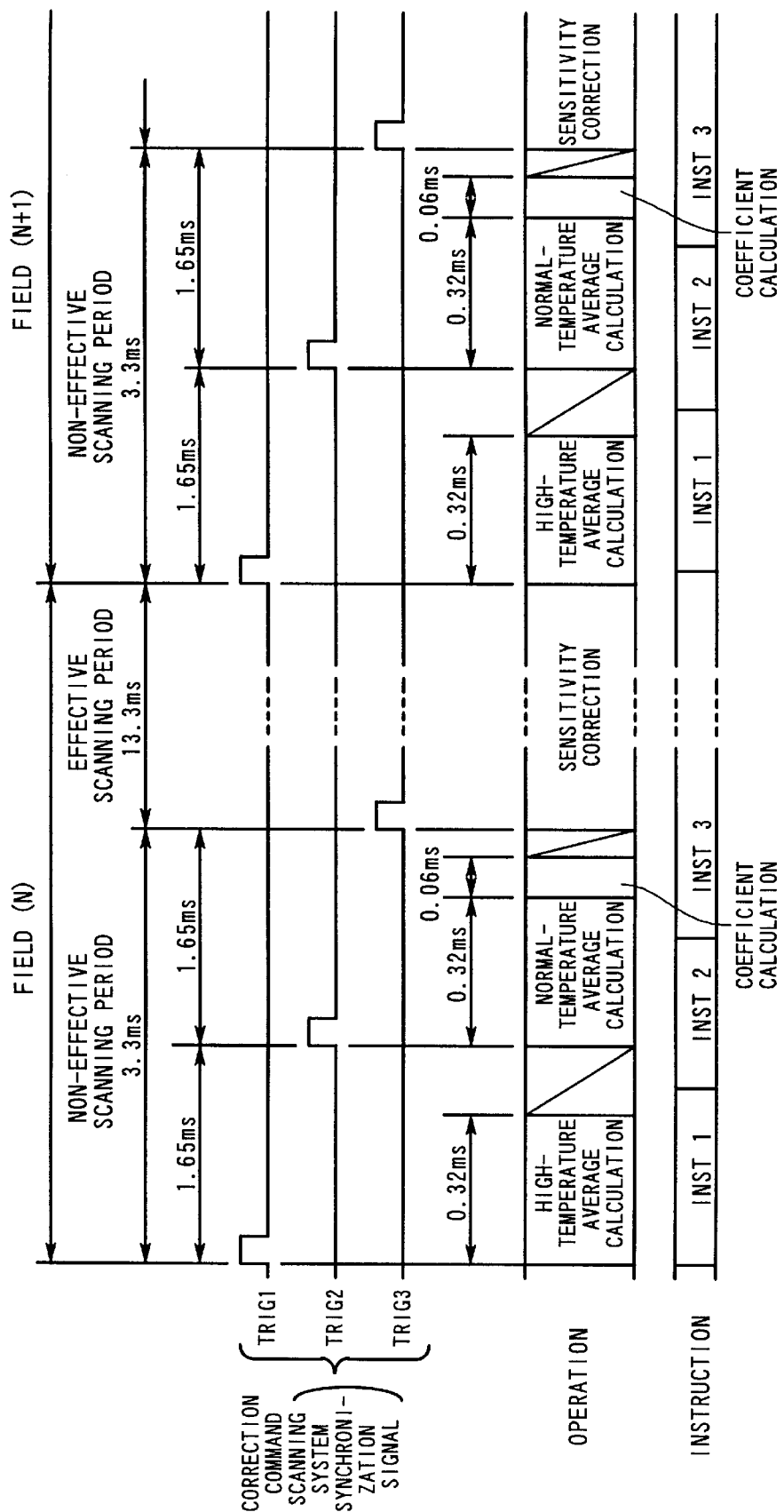
FIG. 17 is a timing diagram which shows the operation of a sensitivity correction sequence controller of the third embodiment.

FIG. 17 is a timing diagram which shows the operation of the sensitivity correction sequence controller 13 of the third embodiment. More specifically, FIG. 13 illustrates the timings of three trigger signals TRIG1 to TRIG3, together with the operation in two consecutive fields (N) and (N+1). With the same assumption of scan timings as in FIG. 9, the effective scanning period is 13.3 ms and the non-effective scanning period is 3.3 ms.

The first trigger signal TRIG1 is generated at the beginning of the non-effective scanning period of field (N). Being stimulated by this TRIG1, the sensitivity correction circuit 6c acquires detection data of the high-temperature reference heat source 10 and calculates their average values. Since the required execution time for this is 0.32 ms as described earlier, the above process can be completed safely within a half of the non-effective scanning period of 3.3 ms. The second trigger signal TRIG2 is generated at the middle point of the non-effective scanning period. With this TRIG2 signal, the sensitivity correction circuit 6c acquires detection data of the normal-temperature reference heat source 11 and calculates their average values, and in addition, it calculates sensitivity correction coefficients. Because the two processes require only 0.38 ms (i.e., 0.32 ms+0.06 ms) as described earlier, they can be finished safely within a half of the non-effective scanning period of 3.3 ms.

At the beginning of the subsequent effective scanning period, the third trigger signal TRIG3 initiates a sensitivity correction process. Since it consumes only 12 ms as described earlier, this process can be safely finished within an effective scanning period of 13.3 ms.

The above-described first to third embodiments of the present invention are not limited to the illustrated configurations, but can be enhanced or modified in various ways. The infrared sensor 3, for example, may have a greater number of sensor elements. Regarding the effective scanning period, the number of scan lines can be more than 300. Instead of using the NTSC interlaced video format, it is also possible to apply a progressive scanning system to collect object images.

The next section will present a fourth embodiment of the present invention.

Figure 18:
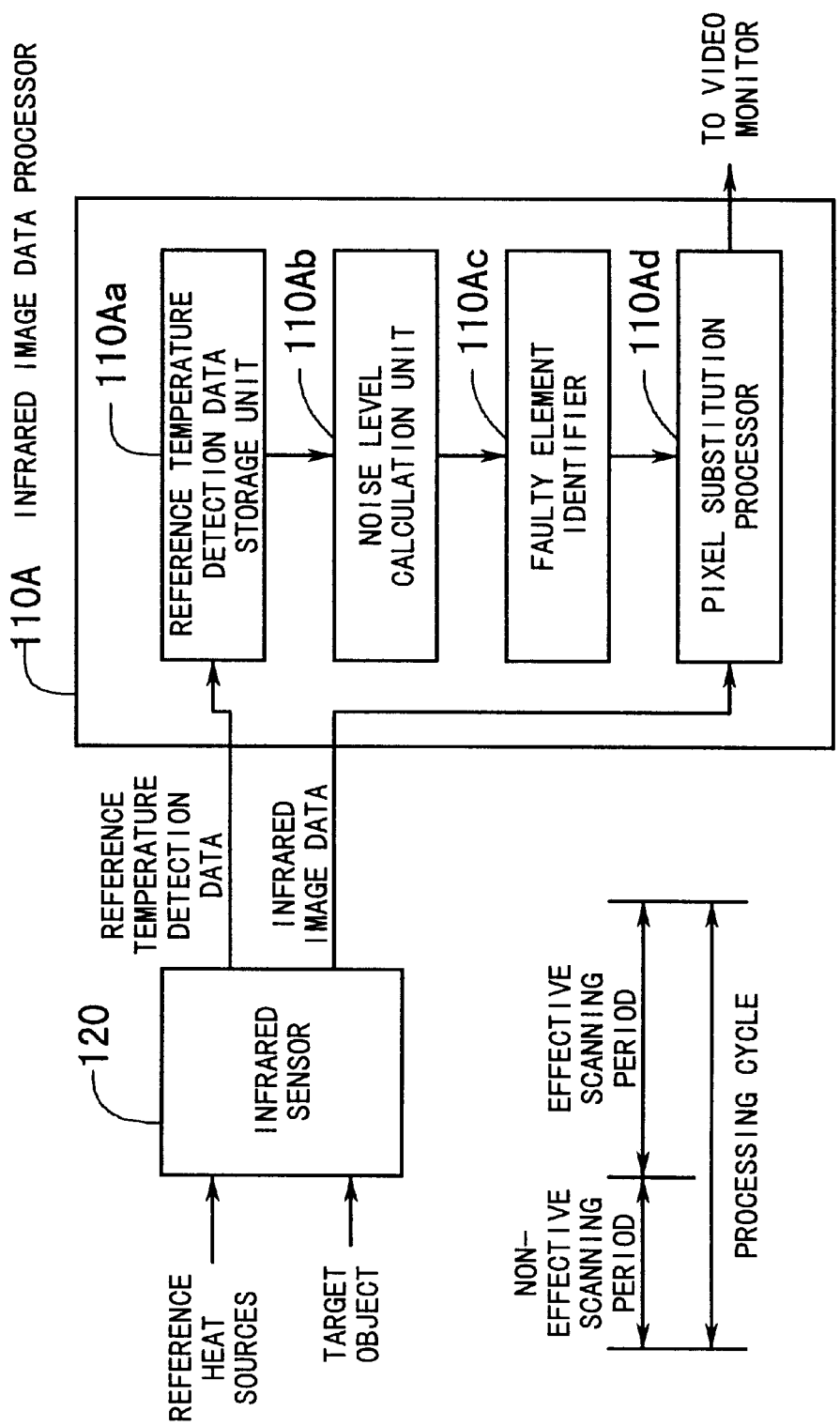
FIG. 18 is a conceptual view of a fourth embodiment of the present invention.

FIG. 18 is a conceptual view of the fourth embodiment of the present invention, in which an infrared sensor 120 is coupled to an infrared image data processor 110A. According to the fourth embodiment, this infrared image data processor 110A comprises the following elements:

(a) a reference temperature detection data storage unit 110Aa which stores the reference temperature detection data during a non-effective scanning period, for each sensor element contained in the infrared sensor 120;

(b) a noise level calculation unit 110Ab which calculates a noise level of each sensor element during an effective scanning period, referring to the reference temperature detection data stored in the reference temperature detection data storage unit 110Aa;

(c) a faulty element identifier 110Ac which is activated during the effective scanning period to identify a faulty sensor element that exhibits an abnormal noise level exceeding a predetermined threshold, while examining noise level values calculated by the noise level calculation unit 110Ab;

(d) a pixel substitution processor 110Ad which is activated during the effective scanning period to replace pixel data of the faulty sensor element with alternative pixel data produced from the output of another sensor element that is located in the vicinity of the faulty sensor element.

In the above structural arrangement, the infrared sensor 120 supplies the infrared image data processor 110A with reference temperature detection data that has been acquired during a non-effective scanning period by scanning reference heat sources (not illustrated). The infrared sensor 120 also captures an infrared image data during an effective scanning period by scanning a target object (not illustrated in FIG. 18), and provides it to the infrared image data processor 110A.

Inside the infrared image data processor 110A, the reference temperature detection data storage unit 110Aa stores reference temperature detection data collected during the last non-effective scanning period, separately for individual sensor elements that constitutes the infrared sensor 120. Actually, the reference temperature detection data contains a number of sampled data words, which encompass a plurality of video fields and a plurality of scan lines in each field. Since each reference heat sources is controlled to keep a constant temperature, the reference temperature detection data would exhibit good uniformity, if no variations exist among the plurality of sensor elements.

In an effective scanning period, the noise level calculation unit 110Ab first calculates a noise level of each individual sensor element by analyzing reference temperature detection data in the reference temperature detection data storage unit 110Aa. Here, the noise is identified as a peak-to-peak difference found in a plurality of reference temperature samples collected by each individual sensor element. In stead of finding peak-to-peak differences, it is also possible to calculate a root-mean-square (rms) of the sampled data words.

Next, the faulty element identifier 110Ac identifies suspicious sensor elements by examining the noise levels calculated by the noise level calculation unit 110Ab. This process extracts particular elements exhibiting relatively high noise levels that exceed a predetermined threshold. Sensor elements showing such abnormal behavior are regarded as faulty and not worthy of sensitivity correction.

When such a faulty element is found by the faulty element identifier 110Ac, the pixel substitution processor 110Ad extracts its pixel data from the captured infrared image, and instead, inserts like pixel data by copying a value of its neighboring pixel. This pixel substitution can be justified, because one pixel and its neighboring pixel are likely to exhibit a close resemblance, and it is thus expected to allow a better image to be reproduced. Even if the neighboring pixel had a dissimilar value, this inconsistency in the immediate vicinity would be indiscernible by the human eye. Therefore, the infrared imaging system of the fourth embodiment is capable of producing good infrared images even when it encounters a failure of infrared sensor elements during operation.

Figure 19:
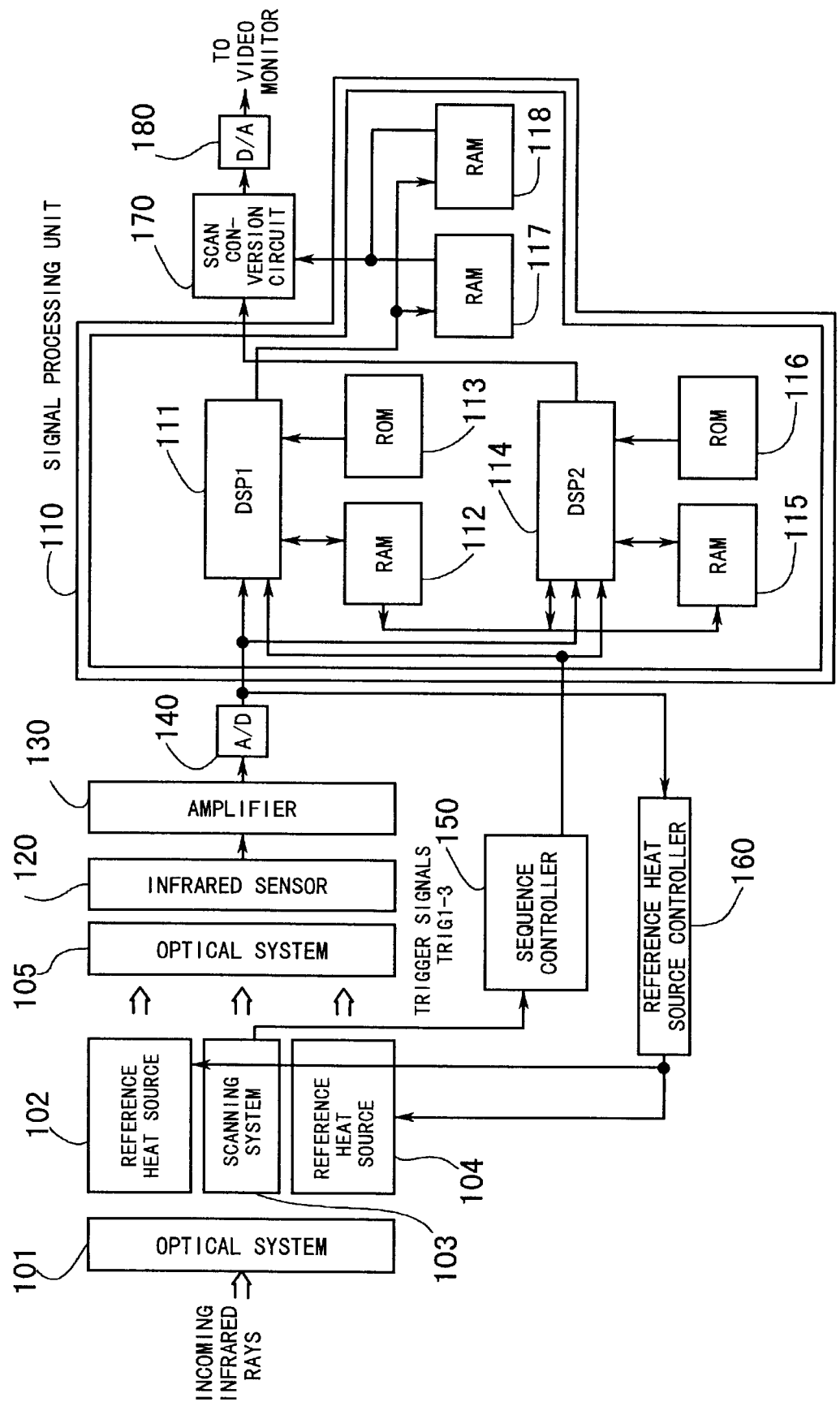
FIG. 19 is a total block diagram of the fourth embodiment.

Referring now to FIG. 19, the following section will provide more detailed explanation of the fourth embodiment. It is noted that a signal processing unit 110 shown in FIG. 19 corresponds to the infrared image data processor 110A of FIG. 18. What have been referred to as the reference temperature detection data storage unit 110Aa, noise level calculation unit 110Ab, faulty element identifier 110Ac, and pixel substitution processor 110Ad are implemented as part of the functions of the signal processing unit 110.

FIG. 19 is a total block diagram of the system. In FIG. 19, optical systems 101 and 105 collect incoming infrared rays and direct them to an infrared sensor 120, while a scanning system 103 permits the infrared sensor 120 to scan a target object. These optical systems 101 and 105, together with the scanning system 103, form an infrared image on the infrared sensor 120. The infrared sensor 120 is a linear array of 180 infrared sensor elements, where each element transduces infrared lights into analog electrical signals. In conjunction with the scanning system 103, the infrared sensor 120 outputs two-dimensional image data with a resolution of 180 pixels by 300 lines. During an effective scanning period, the scanning system 103 scans a given target object. The remaining time, or a non-effective scanning period, is used by the infrared sensor 120 to capture the infrared rays emanating from the high-temperature reference heat source 102 and low-temperature reference heat source 104.

Figure 24:
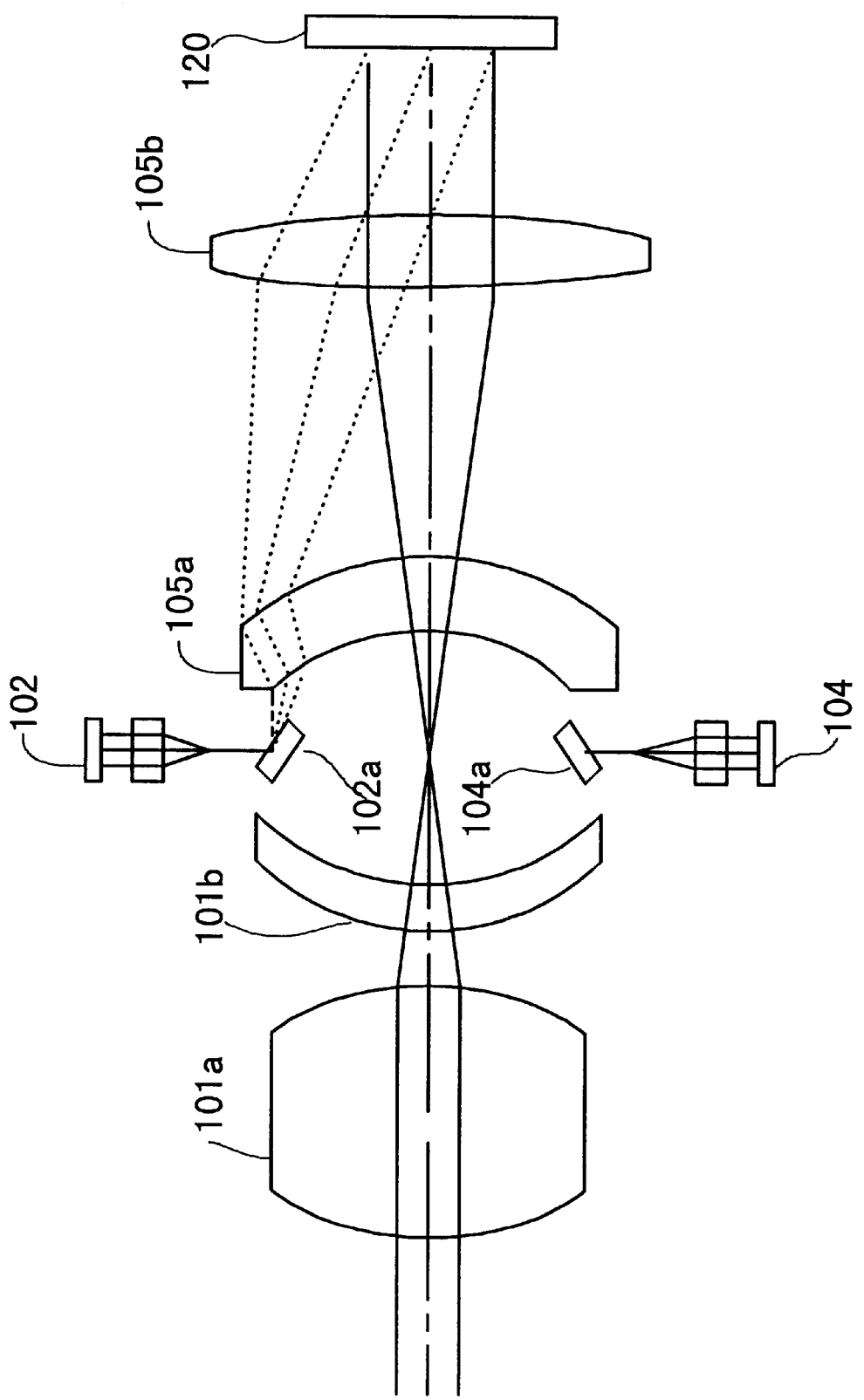
FIG. 24 is a diagram which shows a typical arrangement of optical systems, reference heat sources, and an infrared sensor.

FIG. 24 shows a typical arrangement of the optical systems 101 and 105 and the infrared sensor 120. The first optical system 101 comprises lenses 110a and 101b, while the second optical system 105 comprises lenses 105a and 105b. Infrared rays radiated from target object surfaces pass through those lenses 101a, 101b, 105a, and 105b and finally form an image on the infrared sensor 120. Reference heat sources 102 and 104 are placed between the lenses 101b and 105a. Infrared rays radiated from the reference heat source 102 are reflected by a mirror 102a and entered to the optical system 105a. They are projected onto the infrared sensor 120 via the lenses 105a and 105b. Likewise, infrared rays radiated from the reference heat source 104 are introduced into the optical system 105a by a mirror 104a, and then projected onto the infrared sensor 120 via the lenses 105a and 105b. The optical system is designed so that the elements of the infrared sensor 120 will receive those reference beams with uniform intensity.

Referring back to FIG. 19, the scanning system 103 supplies three trigger signals, TRIG1 to TRIG3, to the sequence controller 150. The first trigger signal TRIG1 is generated when the infrared rays from the high-temperature reference heat source 102 are delivered to the infrared sensor 120. The second trigger signal TRIG2 occurs when the infrared rays from the normal-temperature reference heat source 104 reach the infrared sensor 120. The third trigger signal TRIG3 is generated when the scanning of a target object starts.

The infrared sensor 120 produces an infrared detection signal. Since it is a very weak signal, an amplifier 130 is inserted before an A/D converter 140 to boost its amplitude. The A/D converter 140 converts it into digital form and sends the resultant digital image data to the signal processing unit 110. Normally, the transmission of image data starts with the first scan line of the first field. Image data of the first line is sequentially transferred from its first pixel (or first sensor element) to the 180th pixel, and then the second line starts. The transmission of the first field continues in this way, until the 180th pixel of the 300th scan line is sent out. Further, the second and later fields are transmitted by repeating the same sequence.

In response to the trigger signals from the scanning system 103, the sequence controller 150 generates various instructions to determine the operation of the signal processing unit 110. As will be clarified later, the signal processing unit 110 comprises two DSPs 111 (DSP1) and 114 (DSP2). The above instructions are a set of command signals to govern the DSP1 111 and DSP2 114 to initiate and execute such processes as: acquisition of reference temperature detection data, calculation of sensitivity correction coefficients, sensitivity correction and pixel test, and pixel substitution.

Figure 25:
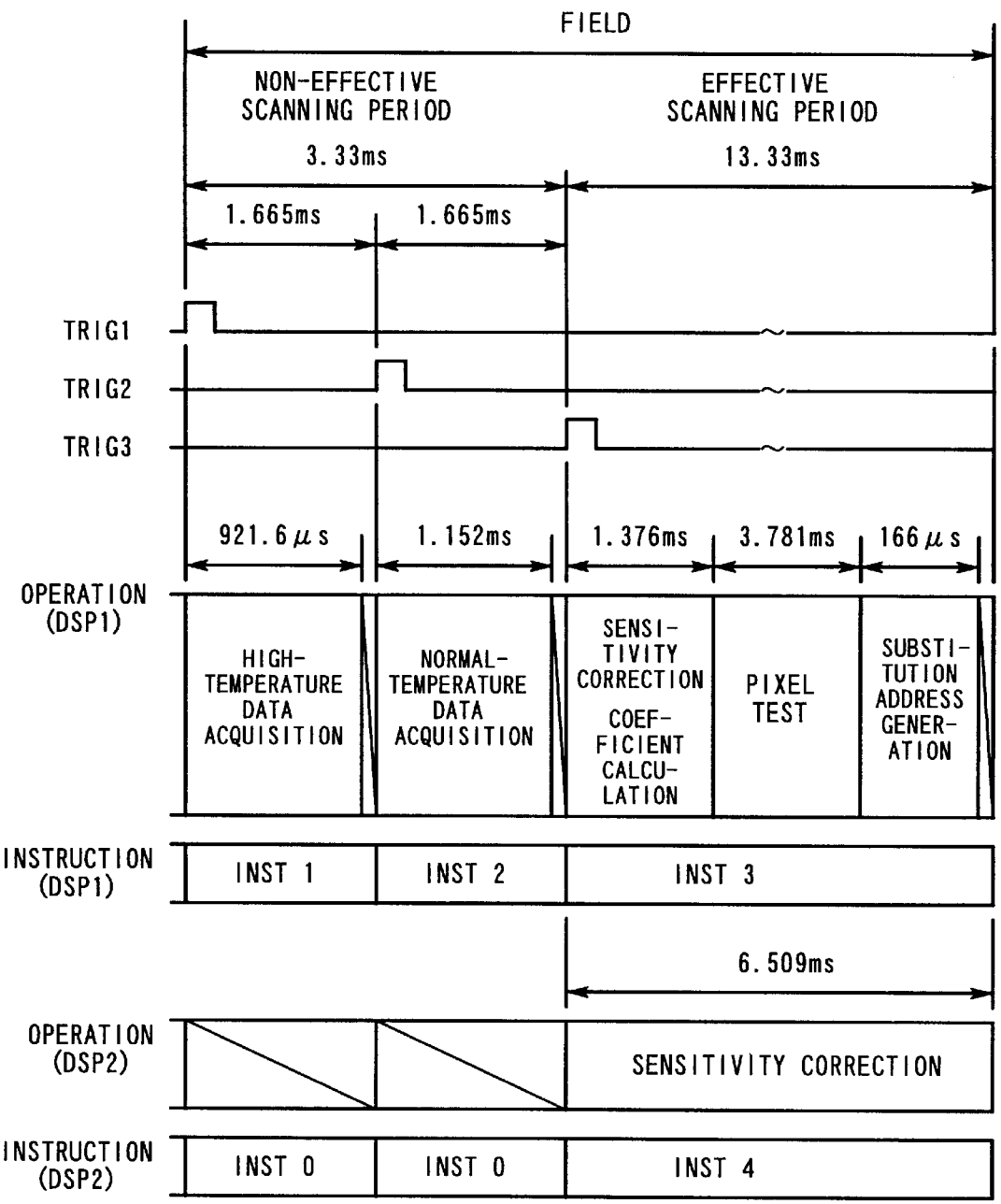
FIG. 25 is a timing diagram which shows the operation of a sequence controller.

FIG. 25 is a timing diagram showing a typical process controlled by the sequence controller 150. In response to the first to third trigger signals sent from the scanning system 103, the sequence controller 150 generates four kinds of instructions, which include INST1 to INST3 for the DSP1 111, and INST0 and INST4 for the DSP2 114. Instruction INST0 initiates "No operation." Instruction INST1 initiates a data acquisition process for high-temperature reference data. Instruction INST2 initiates a data acquisition process for normal-temperature reference data. Instruction INST3 initiates a series of processes, including coefficient calculation, pixel test, and substitution address generation. Instruction INST4 initiates a sensitivity correction process.

As in the other embodiments, the effective scanning period is set to 13.33 ms, and the non-effective scanning period is set to 3.33 ms. The infrared sensor 120 has 180 sensor elements. When collecting reference temperature detection data, the signal processing unit 110 samples 32 scan lines for each field, separately for high temperature and low temperature.

With a limited cycle time, the signal processing unit 110 has to handle such reference temperature detection data that have been acquired during the past 16 fields, including the present field. When the data processing cycle time is 40 ns, the total execution time will be calculated as follows.

First, the data acquisition from the high-temperature reference heat source 102 requires 921.6 $\mu$s, and the data acquisition from the normal-temperature reference heat source 104 consumes 1.152 ms. Therefore, the total data acquisition time is 2.074 ms, which is smaller than a non-effective scanning period of 3.33 ms. Second, it takes 1.376 ms for the DSP1 111 to calculate sensitivity correction coefficients. Pixel test process needs 3.781 ms, and generation of pixel substitution addresses requires 165.6 $\mu$s. These three operations can be finished in an effective scanning period of 13.33 ms, because their total duration is only 5.323 ms. Third, the DSP2 114 spends 6.509 ms to conduct sensitivity correction, which fits into an effective scanning period of 13.33 ms.

Referring back to FIG. 19, the configuration of the signal processing unit 110 will be discussed below. As mentioned earlier, the signal processing unit 110 comprises the following hardware components: two DSPs 111 and 114, four RAMs 112, 115, 117, and 118, and two ROMs 113 and 116. The first role of the DSP1 111 is to acquire reference temperature detection data and to test each pixel data in order to find a faulty sensor element, if any. The second role of the DSP1 111 is to produce an appropriate address code for pixel substitution and to calculate sensitivity correction coefficients. The RAM 112 is used to store the result of pixel test operations performed by the DSP1 111. It also stores sensitivity correction coefficients calculated by the same. The ROM 113 stores firmware code that is executed by the DSP1 111. The DSP2 114 is dedicated to sensitivity correction, while the RAM 115 stores sensitivity correction coefficients. The ROM 116 stores firmware code that is executed by the DSP2 114. The RAMs 117 and 118 are used to hold pixel substitution addresses.

A reference heat source controller 160 regulates the temperatures of two reference heat sources 102 and 104. A scan conversion circuit 170 receives infrared image data captured by the infrared sensor 120 and outputs a video data stream that meets the requirement of NTSC or other appropriate standards. This scan conversion circuit 170 also provides a function to replace the output of a faulty sensor element with the output of its neighboring sensor element. A digital-to-analog (D/A) converter 180 converts the video data stream into an analog video signal that is suitable for display.

Figure 26:
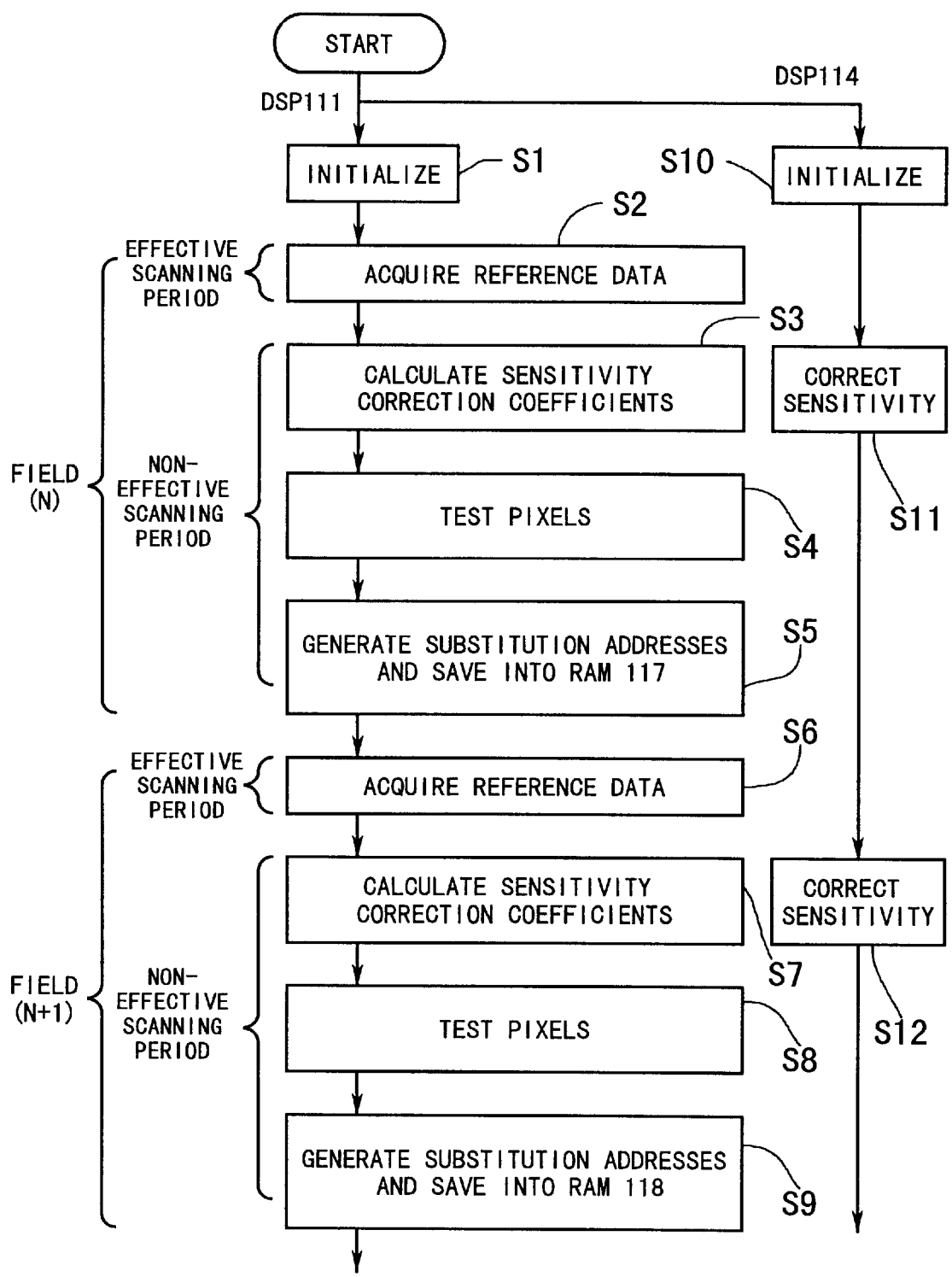
FIG. 26 is a flowchart which shows how two DSPs operate in the signal processing unit.

FIG. 26 is a flowchart which shows how the two DSPs 111 and 114 operate in the signal processing unit 110. In the startup process, the DSPs 111 and 114 initializes their respective local environments (Step S1 and S10). After that, the DSP1 111 acquires reference temperature detection data during the non-effective scanning period of field (N) (Step S2). In the subsequent effective scanning period, the DSP1 111 calculates sensitivity correction coefficients (Step S3), tests every pixel (Step S4), and produces pixel substitution addresses (Step S5). The produced pixel substitution addresses are saved into the RAM 117.

In the next field (N+1), the DSP1 111 executes the same processes as above. That is, it first acquires reference temperature detection data during the non-effective scanning period (Step S6). In the subsequent effective scanning period, it calculates sensitivity correction coefficients (Step S7), tests every pixel (Step S8), and produces pixel substitution addresses (Step S9). Unlike the previous field (N), the produced pixel substitution addresses are now saved into the RAM 118.

On the other hand, the DSP2 114 is designed to execute a sensitivity correction process in an effective scanning period, with the sensitivity correction coefficients that has been calculated by the DSP1 111 in the non-effective scanning period of the previous field. Take step S12 for example. In this step, the DSP2 114 conducts a sensitivity correction process by using the sensitivity correction coefficients calculated in step S3. Likewise, the sensitivity correction process executed in step S11 uses coefficients calculated in the previous field (N−1) (not shown in FIG. 26).

Figure 20:
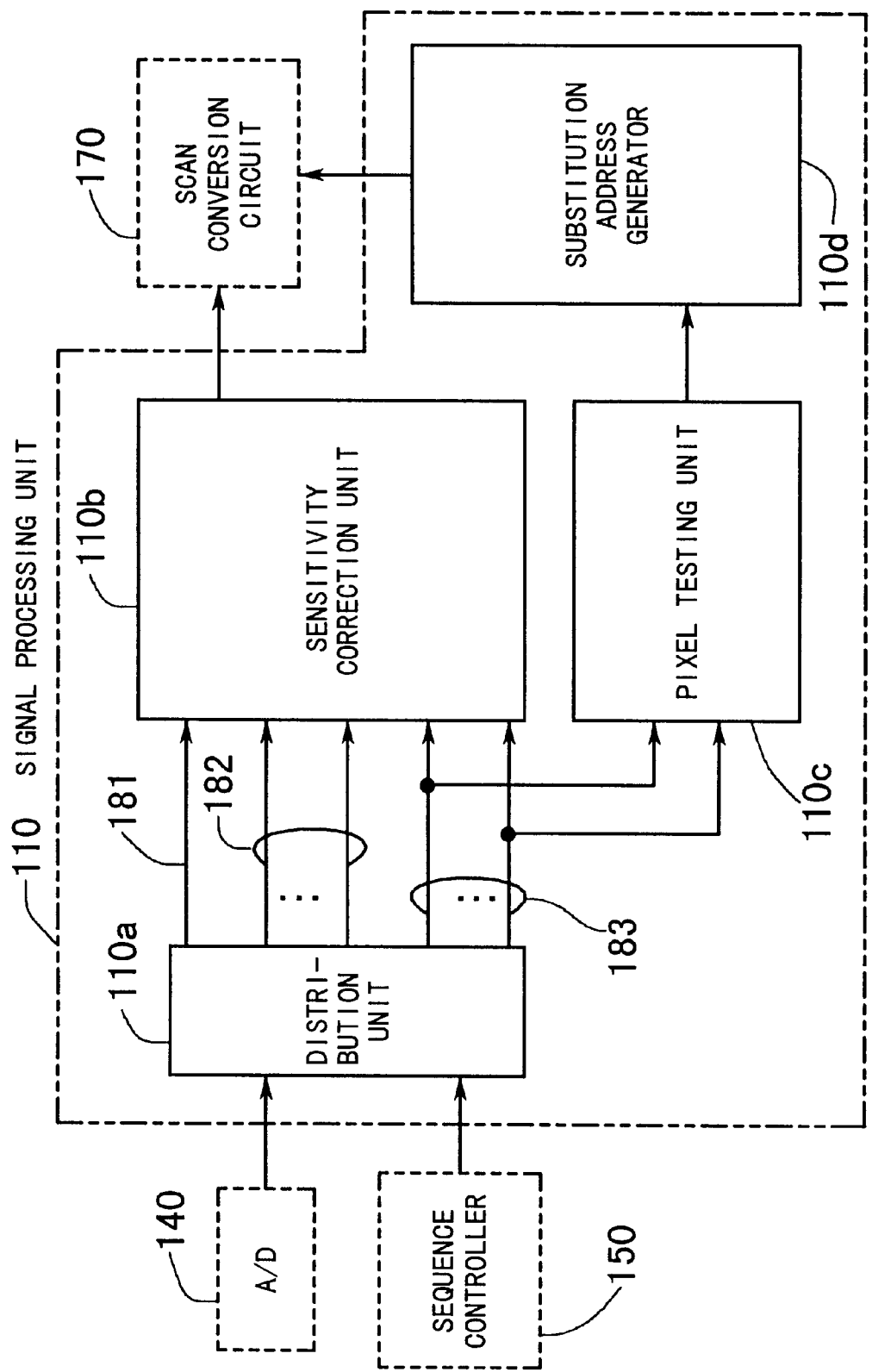
FIG. 20 is a diagram which shows the functional blocks implemented in a signal processing unit of the fourth embodiment.

FIG. 20 shows functional blocks implemented in the signal processing unit 110. The functions of the signal processing unit 110 include: a distribution unit 110a, a sensitivity correction unit 110b, a pixel testing unit 110c, and a substitution address generator 110d. The distribution unit 110a receives reference temperature detection data of each field and infrared image data from the A/D converter 140, and distributes them to the sensitivity correction unit 110b and the pixel testing unit 110c according to the instruction from the sequence controller 150. Infrared image data is transferred over a transmission path 181. Transmission paths 182 are used to distribute high-temperature detection data obtained by scanning the high-temperature reference heat source 102. Note here that the high-temperature detection data sampled in the first to sixteenth fields are separately transferred to the sensitivity correction unit 110b. Transmission paths 183 are used to distribute normal-temperature detection data obtained by scanning the normal-temperature reference heat source 104. Note again that the normal-temperature detection data sampled in the first to sixteenth fields are separately transferred to their destinations. The other functional units 110b, 110c, and 110d will be described below, with reference to FIGS. 21 to 23.

Figure 21:
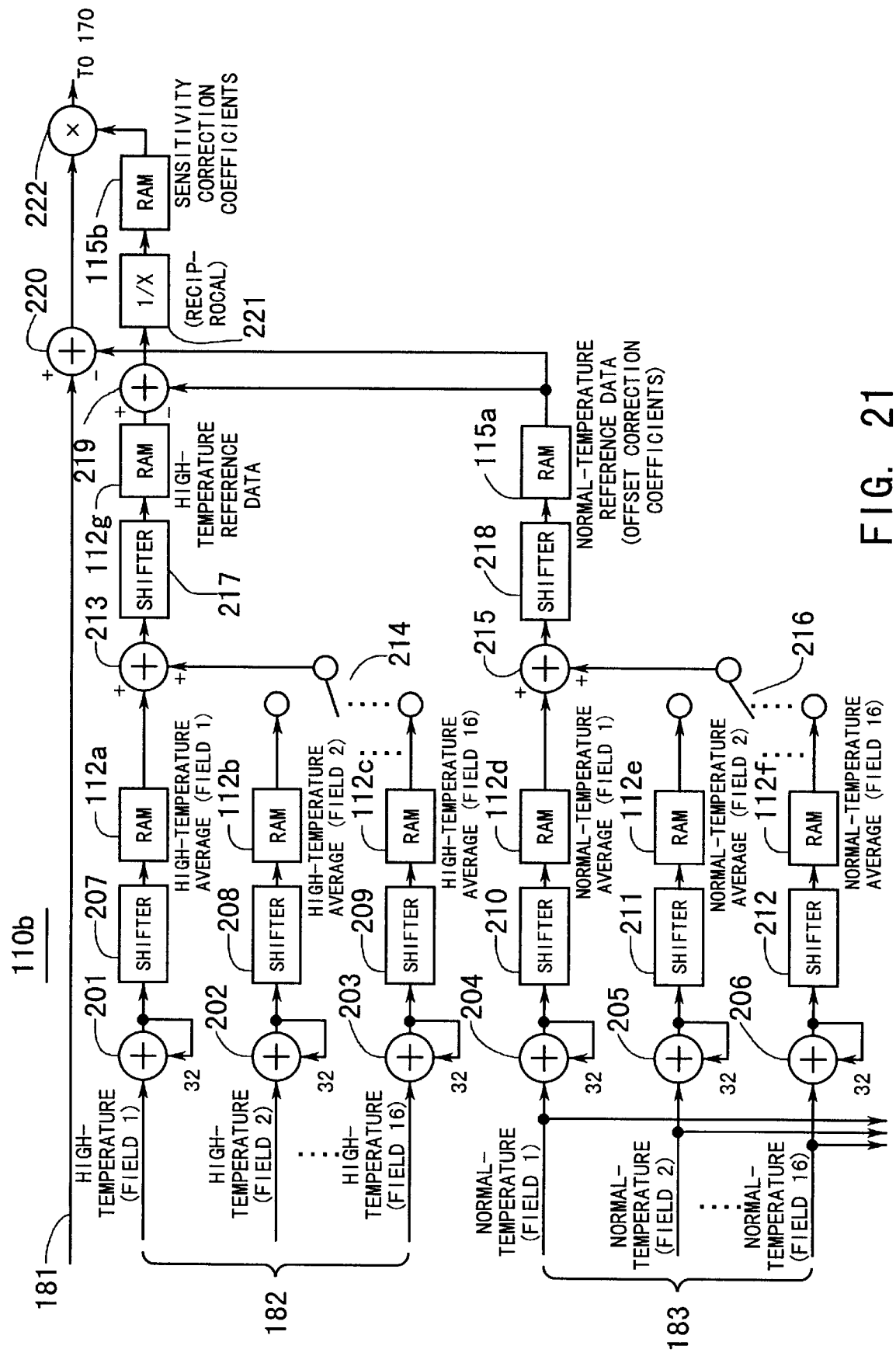
FIG. 21 is a diagram which shows the detailed configuration of a sensitivity correction unit.

FIG. 21 shows the detailed configuration of the sensitivity correction unit 110b. High-temperature detection data sampled in the first field is accumulated by an adder (or accumulator) 201 for the duration of 32 scan lines. A shifter 207 divides the accumulated data by 32, thus producing average values of the sampled high-temperature detection data for individual sensor elements. The resultant values are saved into a RAM 112a. In the second field, the sampled high-temperature detection data is accumulated by an adder 202 for the duration of 32 scan lines. A shifter 208 divides the accumulated data by 32, thus obtaining average values of the sampled high-temperature detection data for individual sensor elements. The resultant values are then saved into a RAM 112b. In the same way as above, the third to fifteenth fields are processed. Finally, the sixteenth field is processed by an adder 203 and a shifter 209, and the resultant average values are saved into a RAM 112c. Here, the RAMs 112a to 112c are part of the RAM 112 in FIG. 19.

In the next step, the average output values of sensor elements stored in the RAMs 112a to 112c are subjected to another averaging process across the past sixteen fields. This process is executed by an adder 213, a selection switch 214, and a shifter 217, and the resultant values are saved into a RAM 112g, which is also part of the RAM 112.

In the same way as the high-temperature data described above, normal-temperature detection data sampled in the first field is processed by an adder 204 and a shifter 210, and the resultant average values are saved into a RAM 112d. Also, those in the second field is processed by an adder 205 and a shifter 211, and the results are saved into a RAM 112e. In a similar manner, the third to fifteenth fields are processed. Finally, normal-temperature detection data in the sixteenth field is processed by an adder 206 and a shifter 212, and the resultant average values are saved into a RAM 112f. Note that all those RAMs 112d to 112f are part of the RAM 112 in FIG. 19.

In the next step, the average output values of sensor elements stored in the RAMs 112d to 112f are subjected to an averaging process across the past sixteen fields. This process is accomplished by an adder 215, a selection switch 216, and a shifter 218. The resultant values are transferred to a RAM 115a after being temporarily stored in the RAM 112. Here, the RAM 115a is part of the RAM 115. The average values stored in the RAM 115 are used as "offset correction coefficients," as noted in FIG. 21.

For each sensor element, a subtractor 219 calculates the difference between the average high-temperature detection data and the average normal-temperature detection data stored in the RAM 112g and the RAM 115a, respectively. The result is sent to a reciprocal operator 221, where the reciprocal of each incoming difference value is calculated. The obtained reciprocal values are once saved in the RAM 112, and then transferred to a RAM 115b. Here, the RAM 115b is part of the RAM 115. The contents of the RAM 115b are used as sensitivity correction coefficients.

Each incoming image data on the transmission line 181 is fed to a subtractor 220, which subtracts the corresponding offset correction coefficients from the image data. The remainders are then directed to a multiplier 222, which multiplies them by corresponding sensitivity correction coefficients read out of the RAM 115b, thus concluding the sensitivity correction process.

Figure 22:
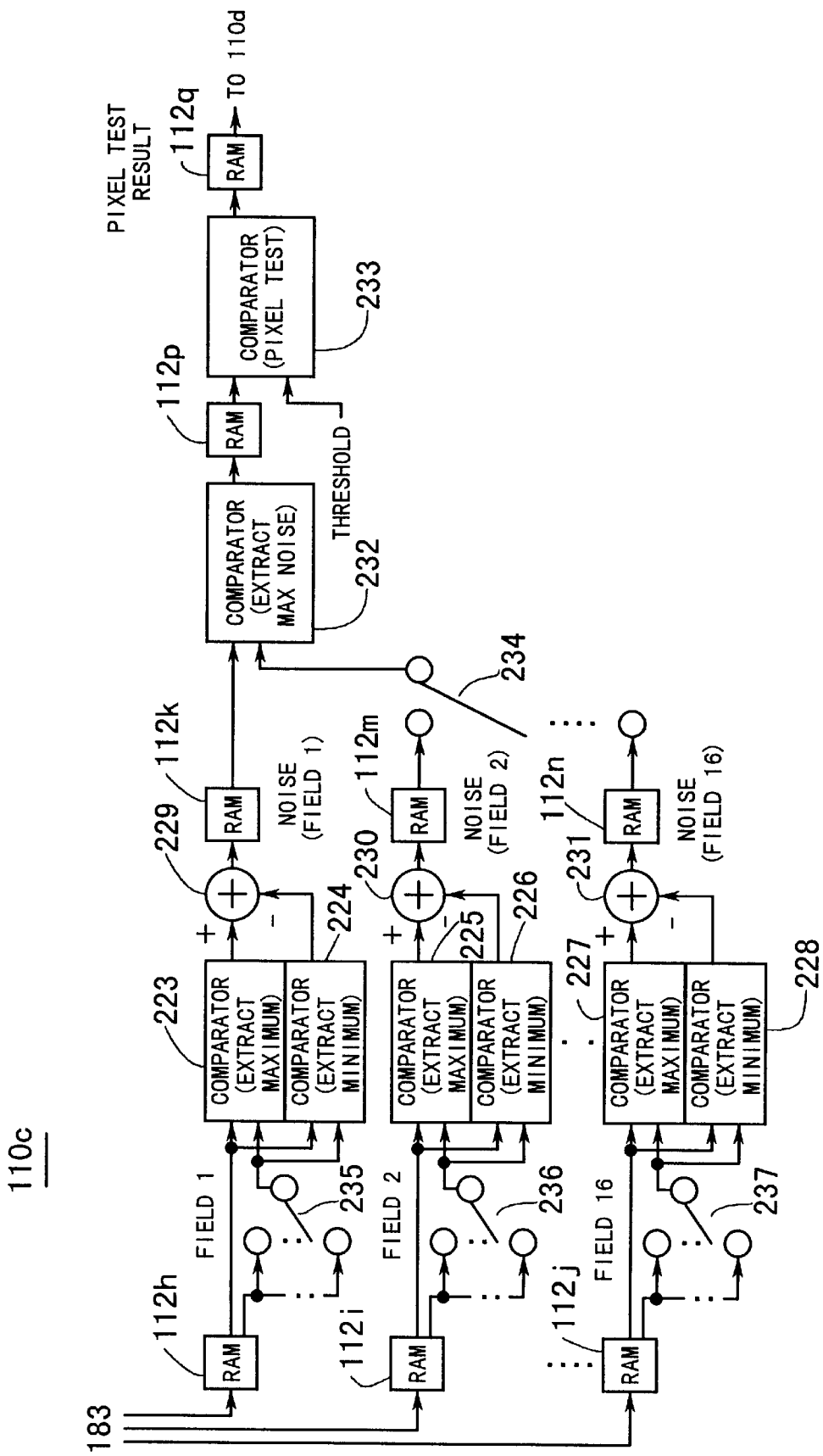
FIG. 22 is a diagram which shows the detailed configuration of a pixel testing unit.

FIG. 22 shows the detailed configuration of the pixel testing unit 110c. In the first field, the maximum and minimum output values of each sensor element are obtained by searching the normal-temperature detection data sampled for 32 scan lines. This search is carried out by the illustrated combination of a RAM 112h, a selection switch 235, and comparators 223 and 224. Then, a subtractor 229 calculates, for each sensor element, the difference between the maximum value and the minimum value. The resultant difference values are saved into a RAM 112k. Here, the RAMs 112h and 112k are part of the RAM 112. The contents of the RAM 112k show the noise levels of individual sensor elements detected in the first field.

In the same way, the maximum and minimum output values of each sensor element in the second field are obtained by searching the normal-temperature detection data sampled for 32 scan lines. This search is carried out by a RAM 112i, a selection switch 236, and comparators 225 and 226. Then, a subtractor 230 calculates, for each sensor element, the difference between the maximum and minimum values. The resultant difference values are saved into a RAM 112*m*. Here, the RAMs 112*i* and 112*m* are part of the RAM 112. The contents of the RAM 112*m* indicate the noise levels of individual sensor elements detected in the second field.

The above-described calculation is repeated for the third to fifteenth fields. Finally, the maximum and minimum output values of each sensor element in the sixteenth field are obtained by searching the normal-temperature detection data sampled for 32 scan lines. This search is carried out by a RAM 112*j*, a selection switch 237, and comparators 227 and 228. Then, a subtractor 231 calculates the difference between the maximum and minimum values of each sensor element. The resultant difference values are saved into a RAM 112*n*. Here, the RAMs 112*j* and 112*n* are part of the RAM 112. The contents of the RAM 112*n* indicate the noise levels of individual sensor elements detected in the sixteenth field.

Now that the noise level data of the first to sixteenth fields are ready in the RAMs 112*k* to 112*n*, the maximum noise level across the past sixteen fields is identified for each sensor element. A selection switch 234 and a comparator 232 make this possible. The resultant values are then stored into a RAM 112*p*, which is part of the RAM 112.

Another comparator 233 compares each maximum noise level value, which is read from the RAM 112*p*, with a predetermined threshold. When it is found that the maximum noise level of a particular sensor element exceeds the given threshold, that sensor element is regarded as defective, and the present output of that element should be discarded. The comparator 233 outputs a binary flag (0: normal, 1: faulty) to indicate the result of such pixel evaluation, and a RAM 112*q* stores those flags corresponding to the individual sensor element. Again, RAM 112*q* is part of the RAM 112.

Figure 23:
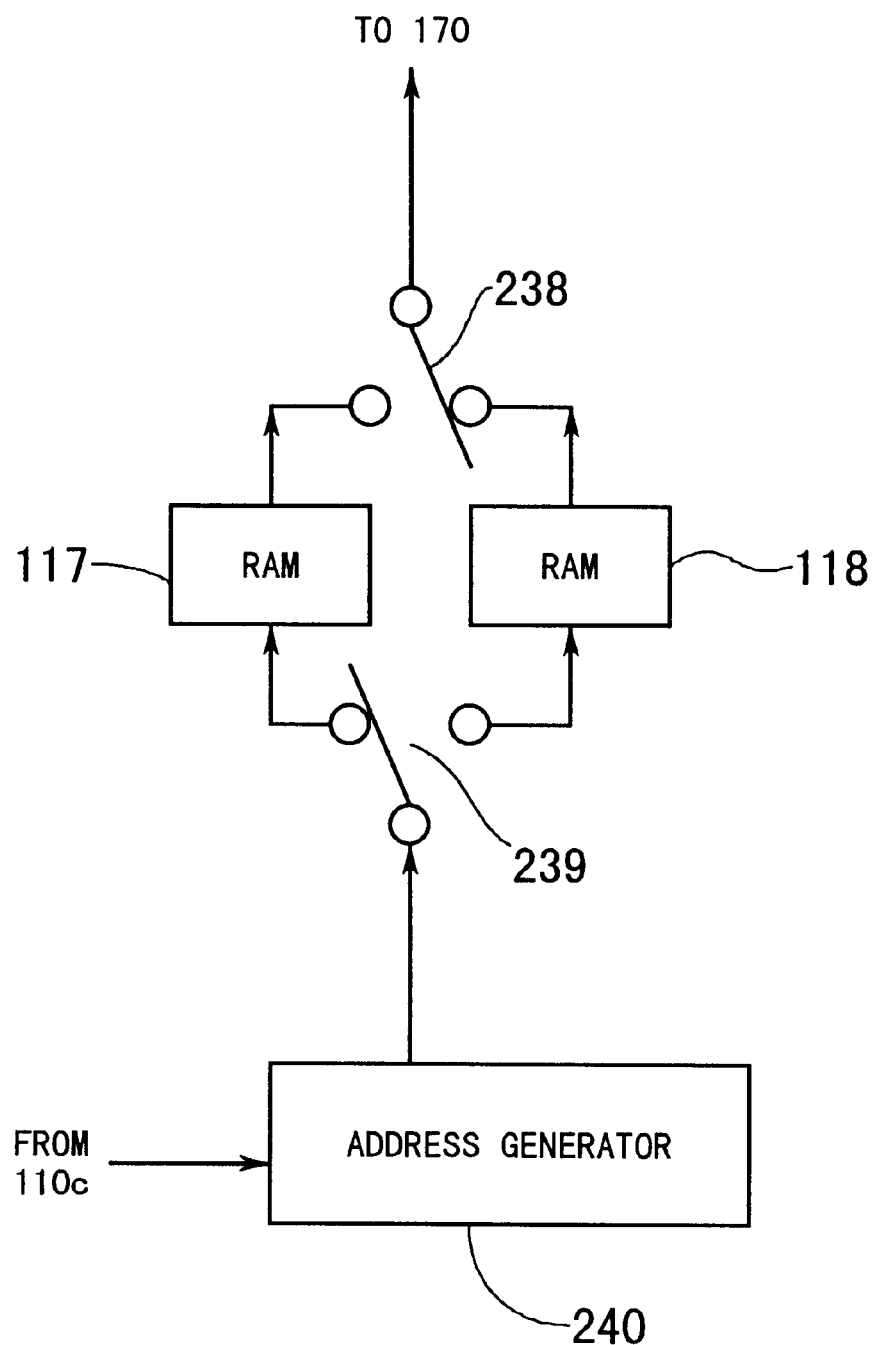
FIG. 23 is a diagram which shows a typical configuration of a substitution address generator.

FIG. 23 shows a preferable configuration of the substitution address generator 110*d*. An address generator 240 produces substitution addresses to rearrange the sequence of pixels from what the infrared sensor 120 generates to what the monitor needs. During the operation, the address generator 240 discards pixel data of particular sensor elements that the pixel testing unit 110*c* has detected as being faulty. This is accomplished by consulting the records in the RAM 112*q*. At the same time, the address generator 240 produces substitution addresses for the discarded pixels to allow them to be replaced with their neighboring normal pixels. The addresses produced as such are saved alternately into a RAM 117 or a RAM 118, field by field. Two selection switches 238 and 239 allow this alternate RAM selection. Suppose, for example, that a selection switch 239 is selecting the RAM 117. During this field, the produced substitution addresses are saved into the RAM 117, while the other selection switch 238 selects the other RAM 118, allowing the stored substitution addresses to be sent out to the scan conversion circuit 170. In the next field, the selection switch 239 selects the RAM 118, while the other selection switch 238 selects the other RAM 117. This enables the stored substitution addresses to be sent out from the RAM 117 to the scan conversion circuit 170.

Since the system has to execute the processes of pixel testing, substitution address generation, and sensitivity correction in a realtime manner, it is unable to update substitution addresses while a sensitivity correction process is active. Therefore, the substitution address generator 110*d* is designed to have two independent RAM devices (117, 118) for alternate use. This configuration makes it possible for the scan conversion circuit 170 to make realtime access to the prepared substitution addresses, permitting pixel data of faulty sensor elements to be replaced with normal ones in a timely manner.

In the above-described fourth embodiment, the pixel testing unit 110*c* calculates the noise levels of individual sensor elements from the difference between their maximum and minimum values. Alternatively, it is possible to configure the pixel testing unit 110*c* to calculate root-mean-square (rms) values of individual sensor outputs, instead of maximum and minimum values.

The next section will present a fifth embodiment of the present invention. Since this fifth embodiment has basically the same structure as the fourth embodiment, the following explanation will focus on the difference from the fourth embodiment.

Figure 27:
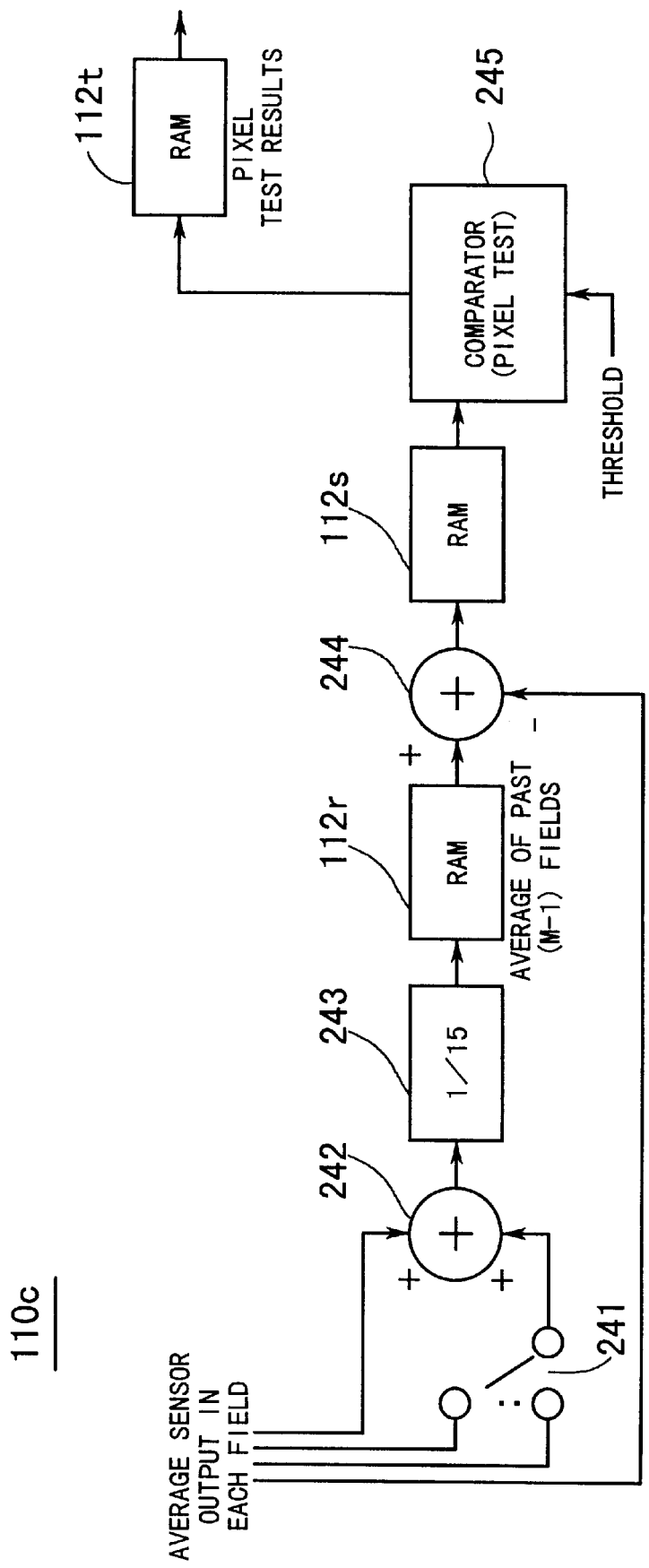
FIG. 27 is a diagram which shows the internal structure of a pixel testing unit according to a fifth embodiment of the present invention.

In the fifth embodiment of the present invention, the pixel testing unit 110*c* has a different internal configuration, in comparison with that of FIG. 20. FIG. 27 shows the internal structure of a pixel testing unit 110*c* according to the fifth embodiment. This pixel testing unit 110*c* calculates the average output of each sensor element in the past 15 fields, excluding the present field. More specifically, normal-temperature detection data are sampled for 32 scan lines in each field, and the average output of each sensor element in the past 15 fields is calculated by a combination of a selection switch 241, an adder (accumulator) 242, and a divider 243. The resultant average values are saved into a RAM 112*r*, which is part of the RAM 112. Separately from the above, an average output of each sensor element is calculated on the basis of normal-temperature detection data that has been sampled for 32 scan lines in the present field. Then, a subtractor 244 calculates the difference between the average values of the past 15 fields, which are stored in the RAM 112*r*, and the average values of the present field. The resultant difference values are saved into a RAM 112*s*, which is part of the RAM 112. The contents of this RAM 112*s* show the DC offset values of individual sensor elements.

A comparator 245 examines each DC offset value read out from the RAM 112*s*, by making a comparison with a predetermined threshold. If a particular sensor element exhibits a large DC offset value exceeding the threshold, the sensor element is regarded as faulty, and its output data should be discarded. The results of such a pixel test are saved into a RAM 112*t*, which is part of the RAM 112. The other functional units in the signal processing unit 110 (i.e., distribution unit 110*a*, sensitivity correction unit 110*b*, and the sensitivity correction unit 110*b*) operate in the same way as in the fourth embodiment.

As described above, in the fifth embodiment, the pixel testing unit 110*c* checks DC offset values to find defective sensor elements, unlike the fourth embodiment, in which faulty elements are detected according to their noise levels. Alternatively, the pixel testing unit 110*c* can also be configured to check both of noise levels and DC offset values. When any anomalies are observed in either factor or both factors, the pixel testing unit 110*c* determines that particular sensor element as faulty.

In the fourth and fifth embodiment of the present invention, the signal processing unit processes reference temperature detection data sampled in the past 16 fields, 32 scan lines for each field. The present invention, however, is not limited to this specific data sampling scheme. Further, the present invention is not limited to the specific infrared sensor with 180 or 200 elements illustrated in the embodiments, or to the specific video format having 300 scan lines per NTSC field.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A realtime sensitivity correction method for compensating for sensitivity variations among a plurality of sensor elements constituting an infrared sensor, the method comprising the steps of:

(a) controlling a high-temperature and normal-temperature reference heat sources so that individual temperatures thereof and a predetermined temperature difference therebetween will be maintained;

(b) obtaining reference temperature detection data by scanning the high-temperature and normal-temperature reference heat sources during a non-effective scanning period in which infrared rays emanating from a target object is not entered to the infrared sensor;

(c) obtaining high-temperature reference data and normal-temperature reference data by calculating average values of the reference temperature detection data;

(d) calculating sensitivity correction coefficients from the high-temperature reference data and the normal-temperature reference data;

(e) obtaining infrared image data by scanning the target object during an effective scanning period; and (f) by using the sensitivity correction coefficients, correcting the infrared image data during the effective scanning period.

2. The realtime sensitivity correction method according to claim 1, wherein:

said steps (b) and (c) are executed in the non-effective scanning period of a field (N);

said step (d) is executed in the non-effective scanning period of a field (N+1); and said steps (e) and (f) are executed in the effective scanning period of the field (N+1) and a field (N+2).

3. The realtime sensitivity correction method according to claim 1, wherein:

said steps (b) and (c) are executed by a first processor in the non-effective scanning period of a field (N);

said steps (b) and (c) are also executed by a second processor in the non-effective scanning period of a field (N+1);

said step (d) is executed by the first processor in the non-effective scanning period of the field (N);

said step (d) is also executed by the second processor in the non-effective scanning period of the field (N+1);

said steps (e) and (f) are executed by the first processor in the effective scanning period of the field (N+1); and said steps (e) and (f) are also executed by the second processor in the effective scanning period of the field (N+2).

4. The realtime sensitivity correction method according to claim 1, wherein:

said steps (b) and (c) are executed in the non-effective scanning period of a field (N);

said step (d) is executed in the non-effective scanning period of the field (N); and said steps (e) and (f) are executed in the effective scanning period of the field (N).

5. An infrared imaging system, comprising:

(a) an infrared sensor having a plurality of sensor elements;

(b) a high-temperature and normal-temperature reference heat sources having a predetermined temperature difference therebetween, which are each controlled to maintain different temperatures;

(c) an optical system which scans a target object during an effective scanning period and scans said high-temperature and normal-temperature reference heat sources during a non-effective scanning period; and (d) a sensitivity correction circuit which compensates for sensitivity variations among the plurality of sensor elements constituting said infrared sensor, comprising a memory which stores high-temperature reference data and normal-temperature reference data obtained by scanning said high-temperature and normal-temperature reference heat sources during the non-effective scanning period, and a processing unit which calculates sensitivity correction coefficients from the high-temperature reference data and the normal-temperature reference data, and by using the calculated sensitivity correction coefficients, corrects infrared image data obtained by scanning the target object during the effective scanning period.

6. The infrared imaging system according to claim 5, wherein:

said sensitivity correction circuit comprises a digital signal processor;

said digital signal processor calculates and saves the high-temperature and normal-temperature reference data into said memory during the non-effective scanning period of field (N), calculates the sensitivity correction coefficients from the high-temperature and normal-temperature reference data in the non-effective scanning period of field (N+1), and by using the calculated sensitivity correction coefficients, corrects the infrared image data of the target object during the effective scanning period of fields (N+1) and (N+2).

7. The infrared imaging system according to claim 5, wherein said sensitivity correction circuit comprises first and second digital signal processors;

said memory comprises first and second random access memories;

said first digital signal processor calculates and saves the high-temperature and normal-temperature reference data into said first random access memory during the non-effective scanning period of field (N), calculates the sensitivity correction coefficients from the high-temperature and normal-temperature reference data in the effective scanning period of the same field (N), and by using the calculated sensitivity correction coefficients, corrects the infrared image data of the target object during the effective scanning period of field (N+1);

said second digital signal processor calculates and saves the high-temperature and normal-temperature reference data into said second random access memory during the non-effective scanning period of the field (N+1), calculates the sensitivity correction coefficients in the effective scanning period of the same field (N+1), and by using the calculated sensitivity correction coefficients, corrects the infrared image data of the target object during the effective scanning period of field (N+2).

8. The infrared imaging system according to claim 5, wherein:

said sensitivity correction circuit comprises an adder, and a multiplier; and said sensitivity correction circuit calculates and saves the high-temperature and normal-temperature reference data into said memory during the non-effective scanning period of field (N), calculates the sensitivity correction coefficients in the same non-effective scanning period of the same field (N), and by using the calculated sensitivity correction coefficients, corrects the infrared image data of the target object during the effective scanning period of the same field (N).

9. An infrared imaging system with a processing cycle time consisting of an effective scanning period and a non-effective scanning period, having an infrared sensor which acquires reference temperature detection data during the non-effective scanning period and captures infrared image data by scanning a target object during the effective scanning period, the system comprising:

(a) reference temperature detection data storage means for storing the reference temperature detection data during the non-effective scanning period, for each sensor element contained in the infrared sensor;

(b) noise level calculation means for calculating a noise level of each sensor element during the effective scanning period, referring to the reference temperature detection data stored in said reference temperature detection data storage means;

(c) faulty element identification means, being activated during the effective scanning period, for identifying a faulty sensor element exhibiting an abnormal noise level exceeding a predetermined threshold, by examining the noise levels calculated by said noise level calculation means; and (d) pixel substitution means, activated during the effective scanning period, for replacing pixel data of the faulty sensor element with pixel data produced by another sensor element that is located in the vicinity of the faulty sensor element being identified.

10. The infrared imaging system according to claim 9, wherein said reference temperature detection data contains a plurality of data words that each sensor element has sampled from a plurality of scan lines of a plurality of fields.

11. The infrared imaging system according to claim 9, wherein said reference temperature detection data contains a plurality of data words that each sensor element has sampled in a plurality of past fields including a field being process at present.

12. The infrared imaging system according to claim 9, wherein said noise level calculation means comprises:

detection means for searching said reference temperature detection data storage means to find a maximum value and a minimum value among the reference temperature detection data produced by each sensor element; and calculation means for determining the noise level of each sensor element by calculating a difference between the maximum value and the minimum values that said detection means has found.

13. The infrared imaging system according to claim 9, wherein said noise level calculation means comprises calculation means for searching said reference temperature detection data storage means and determining the noise level of each sensor element by calculating a root-mean-square value of the reference temperature detection data produced by each sensor element.

14. The infrared imaging system according to claim 9, further comprising first and second substitution address storage means for storing substitution address information created by said faulty element identification means to handle the faulty sensor element identified, wherein said faulty element identification means transfers the substitution address information alternately to said first and second substitution address storage means.

15. The infrared imaging system according to claim 9, wherein said pixel substitution means is activated in the effective scanning period in a field subsequent to the non-effective scanning period.

16. An infrared imaging system with a processing cycle time consisting of an effective scanning period and a non-effective scanning period, having an infrared sensor which acquires reference temperature detection data during the non-effective scanning period and captures infrared image data by scanning a target object during the effective scanning period, the system comprising:

reference temperature detection data storage means for storing the reference temperature detection data during the non-effective scanning period, for each sensor element contained in the infrared sensor;

DC offset calculation means for calculating a DC offset value of each sensor element during the effective scanning period, referring to the reference temperature detection data stored in said reference temperature detection data storage means;

faulty element identification means, being activated during the effective scanning period, for identifying a faulty sensor element exhibiting an abnormal DC offset value exceeding a predetermined threshold, by examining the DC offset values calculated by said DC offset calculation means; and pixel substitution means, activated during the effective scanning period, for replacing pixel data of the faulty sensor element with pixel data produced by another sensor element that is located in the vicinity of the faulty sensor element being identified.

17. The infrared imaging system according to claim 16, wherein said DC offset calculation means comprises calculation means for searching said reference temperature detection data storage means and determining the DC offset value of each sensor element by calculating a difference between a present field with past fields in terms of average values of the reference temperature detection data.

* * * * *